(12) United States Patent
Takakubo

(10) Patent No.: US 6,954,296 B2
(45) Date of Patent: Oct. 11, 2005

(54) SCANNING OPTICAL SYSTEM

(75) Inventor: Yutaka Takakubo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 109 days.

(21) Appl. No.: 10/347,282

(22) Filed: Jan. 21, 2003

(65) Prior Publication Data
US 2003/0193703 A1 Oct. 16, 2003

(30) Foreign Application Priority Data
Jan. 18, 2002 (JP) ........................................ 2002-010763

(51) Int. Cl.$^7$ ............................................. G02B 26/08
(52) U.S. Cl. ........................ 359/207; 359/216; 359/204
(58) Field of Search ................................. 359/204–207, 359/216–219, 662; 347/233, 243–244, 259–261

(56) References Cited

U.S. PATENT DOCUMENTS

| | | | |
|---|---|---|---|
| 5,025,268 A * | 6/1991 | Arimoto et al. ............ 347/259 |
| 5,418,639 A | 5/1995 | Yamazaki |
| 6,317,245 B1 | 11/2001 | Hama et al. |
| 6,392,772 B1 | 5/2002 | Hama et al. |
| 6,392,773 B1 | 5/2002 | Hama et al. |
| 6,396,615 B1 | 5/2002 | Hama et al. |
| 6,633,423 B2 * | 10/2003 | Ishibe ........................ 359/205 |
| 2003/0072042 A1 * | 4/2003 | Koreeda ..................... 358/505 |

FOREIGN PATENT DOCUMENTS

| | | |
|---|---|---|
| JP | 8-122635 | 5/1996 |
| JP | 10148755 | 6/1998 |

\* cited by examiner

Primary Examiner—James Phan
(74) Attorney, Agent, or Firm—Greenblum & Bernstein, P.L.C.

(57) ABSTRACT

A scanning optical system is provided with a light source, a polygonal mirror, and an imaging optical system that converges the at least one beam deflected by the polygonal mirror. The imaging optical system has a scanning lens, and a compensation lens. The light source is arranged so that beams emitted by the light source are incident on the polygonal mirror from the outside of the predetermined scanning range in the main scanning direction and are incident on the polygonal mirror being inclined in an auxiliary scanning direction with respect to a plane perpendicular to a rotational axis of the polygonal mirror. Further, at least one surface of the scanning lens has a first anamorphic surface, power of the first anamorphic surface in the auxiliary scanning direction is distributed asymmetrically in the main scanning direction with respect to an optical axis of said scanning lens. Further, power of each surface of the compensation lens in the auxiliary scanning direction is distributed symmetrically with respect to a center position of said each surface.

18 Claims, 19 Drawing Sheets

FIG. 7
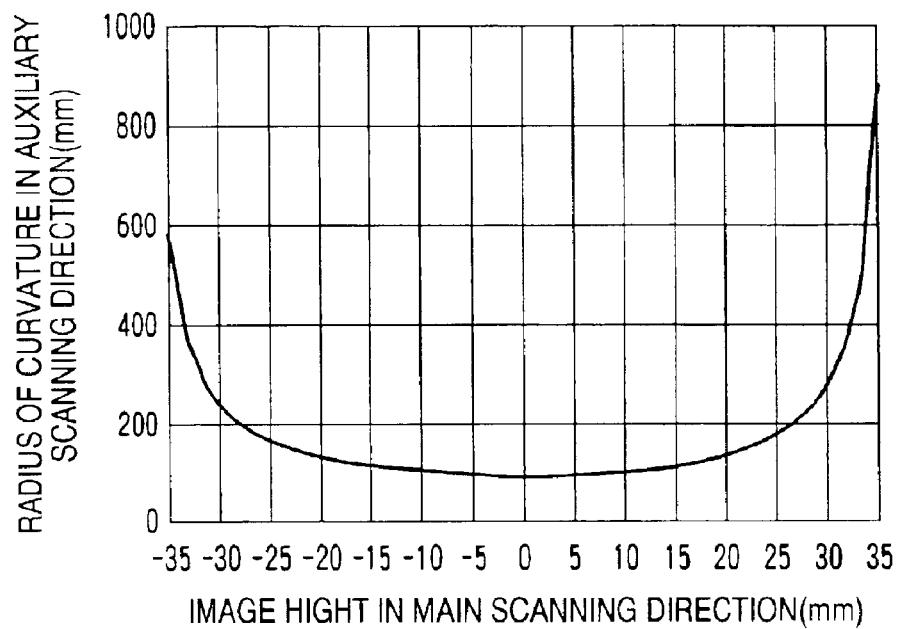
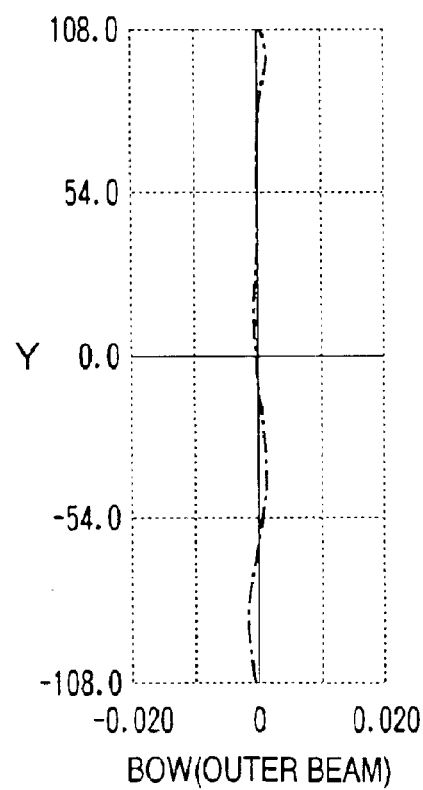
FIG.8A
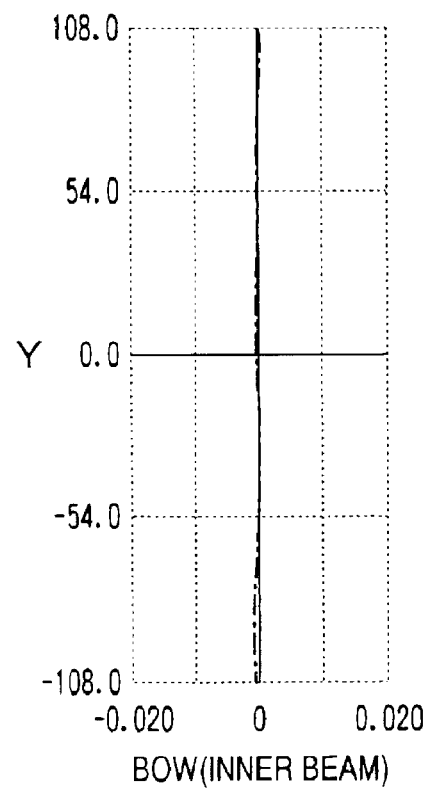
FIG.8B

CURVATURE OF FIELD
(OUTER BEAM)

CURVATURE OF FIELD
(INNER BEAM)

CHANGE OF F NUMBER
(OUTER BEAM)

CHANGE OF F NUMBER
(INNER BEAM)

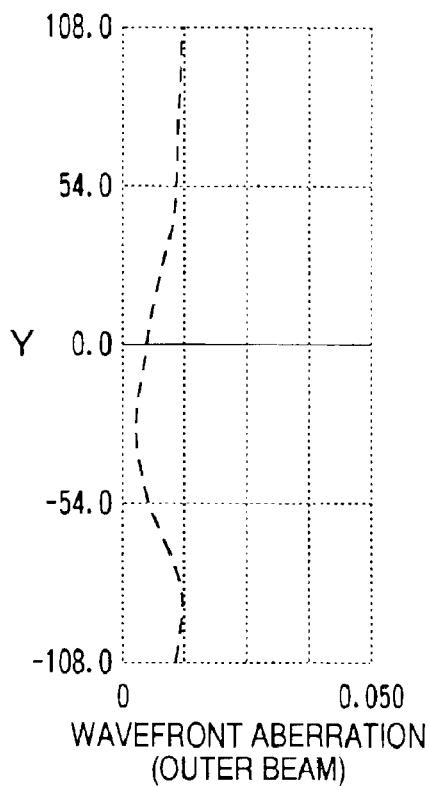
FIG.22A WAVEFRONT ABERRATION (OUTER BEAM)
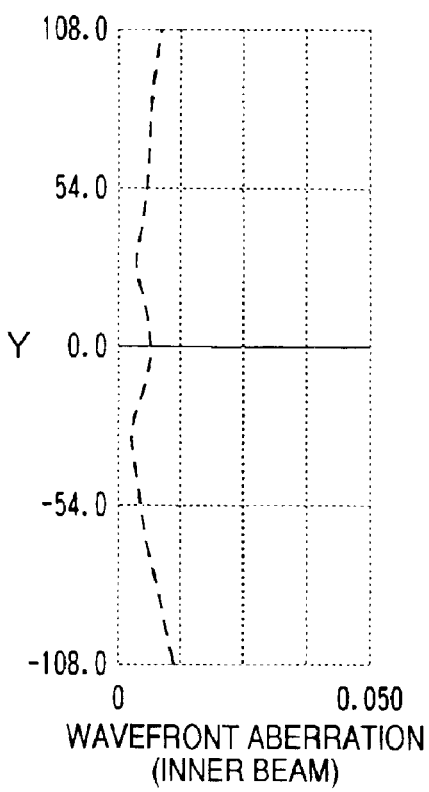
FIG.22B WAVEFRONT ABERRATION (INNER BEAM)
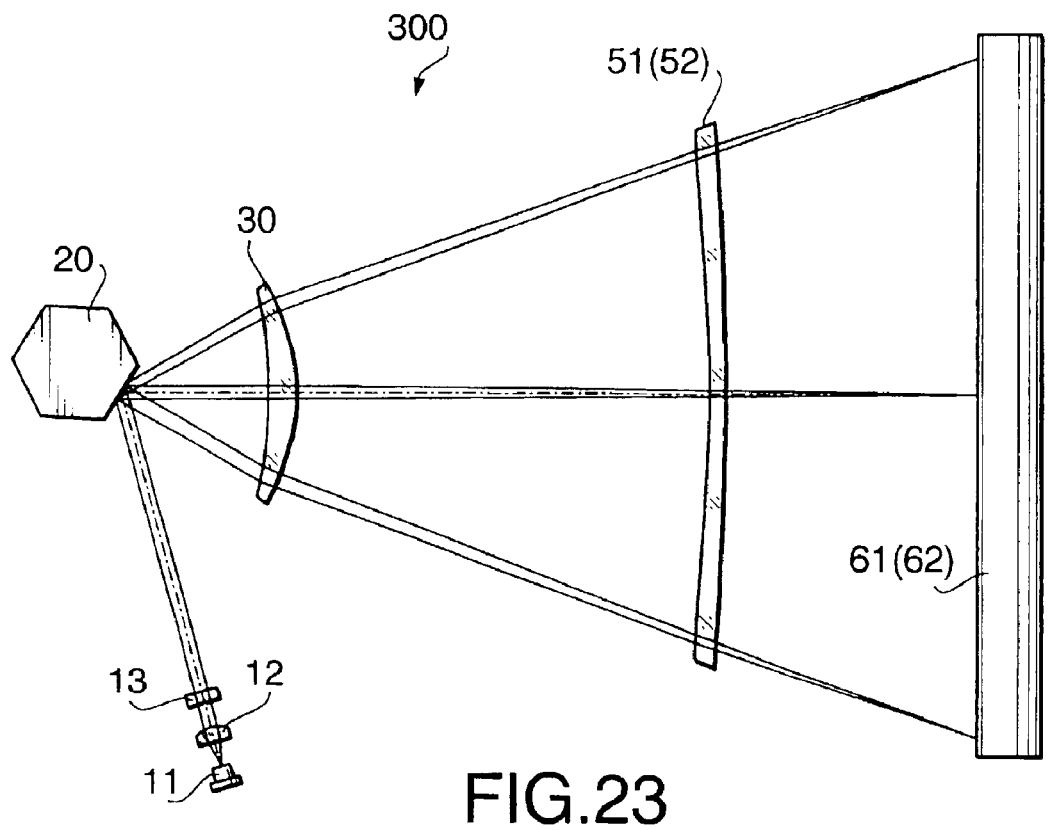
FIG.23

WAVEFRONT ABERRATION
(OUTER BEAM)

WAVEFRONT ABERRATION
(INNER BEAM)

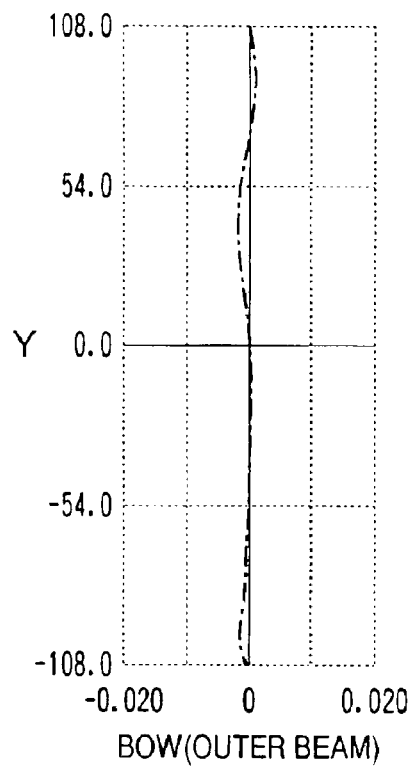
FIG.36A BOW(OUTER BEAM)
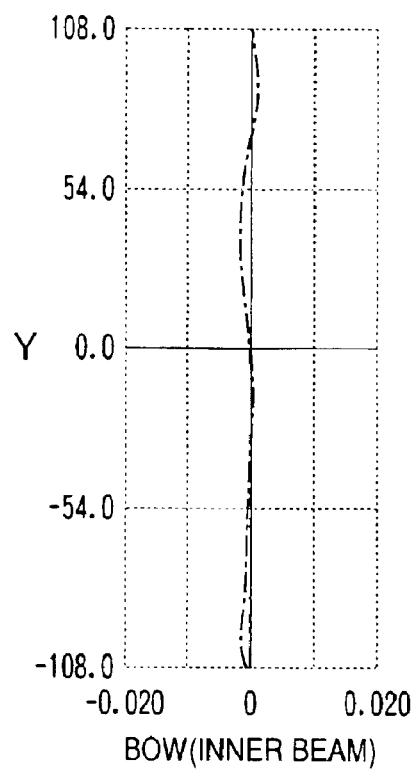
FIG.36B BOW(INNER BEAM)
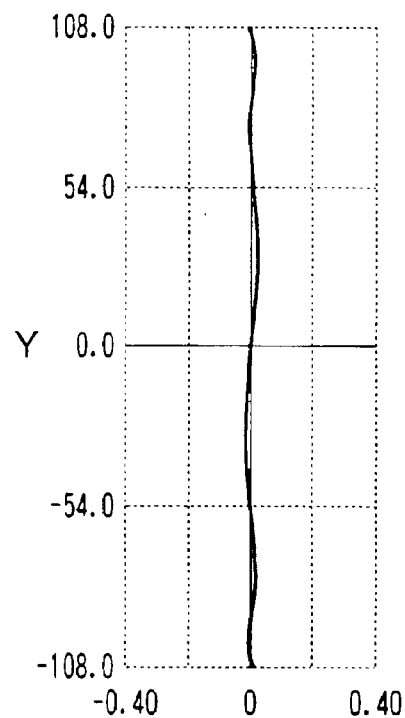
FIG.37A fθ CHARACTERISTIC (OUTER BEAM)
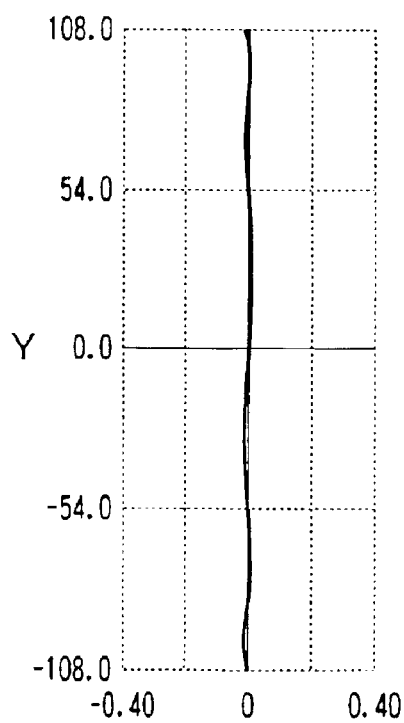
FIG.37B fθ CHARACTERISTIC (INNER BEAM)

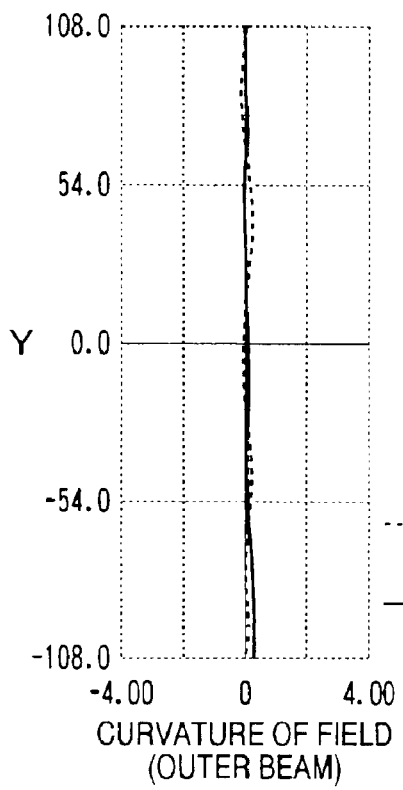
FIG.38A CURVATURE OF FIELD (OUTER BEAM)
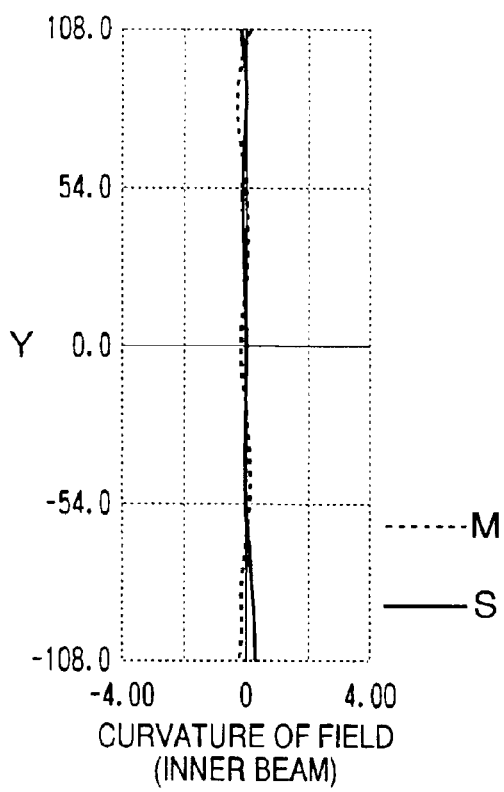
FIG.38B CURVATURE OF FIELD (INNER BEAM)
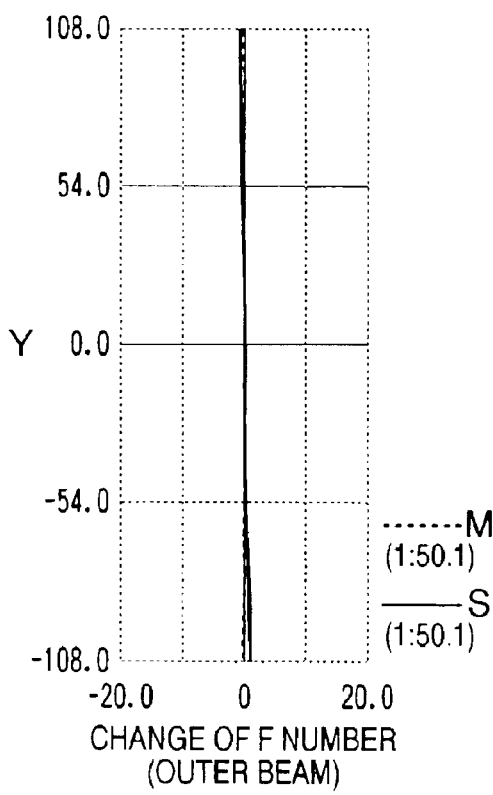
FIG.39A CHANGE OF F NUMBER (OUTER BEAM)
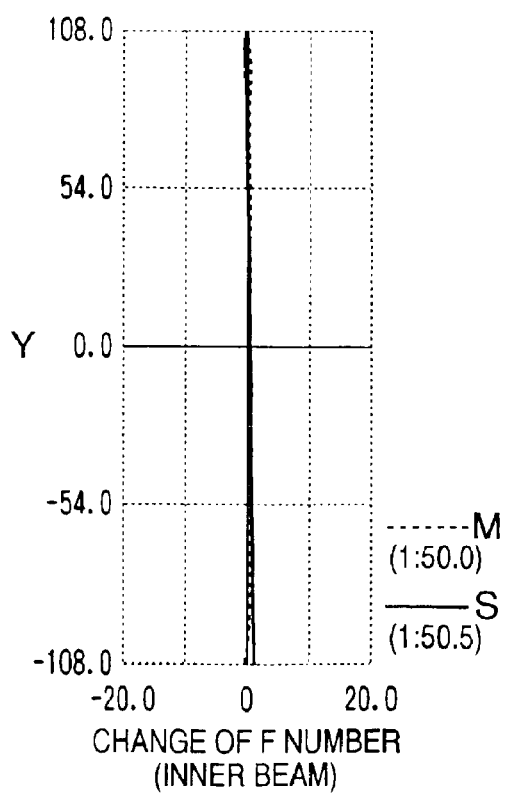
FIG.39B CHANGE OF F NUMBER (INNER BEAM)

SCANNING OPTICAL SYSTEM

BACKGROUND OF THE INVENTION

The present invention relates to a scanning optical system which is employed in, for example, a laser beam printer.

In a scanning optical system for a laser beam printer, a laser beam emitted by a laser diode is deflected by a polygonal mirror to scan within a predetermined angular range. The scanning beam passes through an imaging optical system which converges the deflected laser beam to form a scanning beam spot onto a surface to be scanned, for example, a photoconductive surface. As the polygonal mirror rotates, the beam spot moves on the photoconductive surface. By ON/OFF modulating the beam spot as it moves, an electrostatic latent image is formed on the photoconductive surface.

Hereinafter, a direction, on the photoconductive surface, in which the beam spot moves as the polygonal mirror rotates is referred to as a main scanning direction, and a direction perpendicular to the main scanning direction, on the photoconductive surface, is referred to as an auxiliary scanning direction.

Further, shape and direction of power of each optical element is described with reference to directions on the photoconductive surface. Further, a plane perpendicular to a rotation axis of the polygonal mirror and including an optical axis of a scanning lens in the imaging optical system is defined as a main scanning plane.

A multi-beam scanning optical system and a tandem type scanning optical system are known in the art, as well as the above described scanning optical system in which a single laser beam is used. In the multi-beam scanning optical system, a plurality of scanning lines are formed simultaneously on a photoconductive drum. In the tandem type scanning optical system, a plurality of scanning lines are formed on a plurality of photoconductive drums, respectively.

Sometimes, a multi-beam scanning optical system or the tandem type scanning optical system is configured such that a plurality of beams are deflected simultaneously by a single polygonal mirror. If the plurality of beams are respectively inclined in the auxiliary scanning direction, and are incident on substantially the same point on the polygonal mirror, the thickness of the polygonal mirror can be reduced, which reduces a manufacturing cost of the polygonal mirror.

However, if each laser beam is incident on the polygonal mirror as inclined in the auxiliary scanning direction, i.e., as inclined with respect to a plane perpendicular to a rotational axis of the polygonal mirror, a bow occurs, that is, a scanning line, which is defined as a locus of a beam on a surface to be scanned, curves.

Further, if the scanning optical system is configured such that each laser beam emitted by the laser source is incident on the polygonal mirror from the outside of a predetermined scanning range in the main scanning direction, a change of an intersection (i.e., a deflection position) between a reflection surface of the polygonal mirror and each laser beam becomes asymmetrical with respect to an optical axis of the scanning lens, because the rotational axis of the polygonal mirror is not located on the optical axis. As a result, a scanning line is inclined with respect to the main scanning direction.

If the above described two problems occur simultaneously, a curve of the scanning line become asymmetrical with respect to a center position of the scanning line.

Since an angle of the inclination of the scanning line with respect to the main scanning direction varies according to an incident angle of the laser beam with respect to the reflection surface in the auxiliary scanning direction, it is very difficult to match all scanning lines with respect to each other. If the plurality of scanning lines corresponding to the plurality of laser beams do not coincide with respect to each other, color drift may appear in a printed image, that is, printing quality is badly affected.

SUMMARY OF THE INVENTION

The present invention is advantageous in that it provides a scanning optical system which is capable of correcting asymmetry of a curve of a scanning line with respect to a center position of the scanning line even if a change of a deflection position (i.e., an intersection between a reflection surface of a polygonal mirror and each laser beam) is asymmetrical with respect to an optical axis of a scanning lens.

According to an aspect of the invention, there is provided a scanning optical system for emitting at least one beam scanning in a main scanning direction. The scanning optical system is provided with a light source that emits at least one beam, a polygonal mirror that rotates and deflects the at least one beam to scan in the main scanning direction within a predetermined scanning range, and an imaging optical system that converges the at least one beam deflected by the polygonal mirror to form at least one beam spot on a surface to be scanned, the at least one beam spot scanning in the main scanning direction on the surface to be scanned. The imaging optical system has a scanning lens, and a compensation lens provided on the surface side with respect to the scanning lens, the compensation lens compensating for curvature of field. Further, the light source is arranged such that the at least one beam emitted by the light source is incident on the polygonal mirror from the outside of the predetermined scanning range in the main scanning direction and is incident on the polygonal mirror with the at least one beam being inclined in an auxiliary scanning direction with respect to a plane perpendicular to a rotational axis of said polygonal mirror.

In the above configuration, at least one surface of the scanning lens has a first anamorphic surface, power of the first anamorphic surface in the auxiliary scanning direction is distributed asymmetrically in the main scanning direction with respect to an optical axis of the scanning lens. Further, power of each surface of the compensation lens in the auxiliary scanning direction is distributed symmetrically with respect to a center position of the each surface.

With this configuration, an inclination of a scanning line caused by asymmetry of a change of the deflection position can be corrected because the anamorphic surface of the scanning lens has asymmetry of distribution in the main scanning direction of power in the auxiliary scanning direction.

In a particular case, the first anamorphic surface of the scanning lens may be symmetrical with respect to a plane perpendicular to the auxiliary scanning direction and including the optical axis, and the compensation lens may include a second anamorphic surface which is asymmetrical with respect to a plane perpendicular to the auxiliary scanning direction and including a center position of the second anamorphic surface.

Alternatively, the first anamorphic surface of the scanning lens may be configured such that a cross-sectional shape thereof in the main scanning direction is defined as a function of a distance, in the main scanning direction, from the optical axis of the scanning lens, a cross-sectional shape thereof in the auxiliary scanning direction is formed as an arc, and a curvature in the auxiliary scanning direction is defined as a function of a distance, in the main scanning direction, from the optical axis, the cross-sectional shape in the main scanning direction and the curvature in the auxiliary scanning direction being defined independently from each other.

Optionally, the first anamorphic surface of the scanning lens may satisfy a condition:

$$|Rz(0)|<|Rz(-Y)|<|Rz(Y)|,$$

where Rz(Y) represents a radius of curvature thereof in the auxiliary scanning direction at a distance Y, the distance Y represents a distance in the main scanning direction with respect to the optical axis, a minus sign of the distance Y corresponds to a side on which the at least one beam is incident on said polygonal mirror, and a plus sign of the distance Y corresponds to the other side.

In a paerticular case, one surface of the compensation lens may have an aspherical surface, the aspherical surface being defined as a surface in which a tilt angle of a cross-sectional shape in the auxiliary scanning direction changes with a position in the main scanning direction, the aspherical surface being asymmetrical with respect to a plane perpendicular to the auxiliary scanning direction and including a center position thereof.

Optionally, the aspherical surface of the compensation lens may be defined by a two-dimensional polynomial expression in which a SAG amount between a point on said aspherical surface and a plane tangential to the aspherical surface at the center position is defined by coordinates along the main scanning direction and the auxiliary scanning direction.

In a particular case, the scanning lens may be made of plastic.

In a particular case, the light source may emit a plurality of beams, incident angles of the plurality of beams with respect to the polygonal mirror in the auxiliary scanning direction being different from each other, all of the plurality of beams passing though said scanning lens, and the compensation lens is provided for each of the plurality of beams.

According to another aspect of the invention, there is provided a scanning optical system for emitting a plurality of beams scanning in a main scanning direction. The scanning optical system is provided with a light source that emits the plurality of beams, a polygonal mirror that rotates and deflects the plurality of beams to scan in the main scanning direction within a predetermined scanning range, and an imaging optical system that converges the plurality of beams deflected by said polygonal mirror to form the plurality of beam spots on surfaces to be scanned, said plurality of beam spots scanning in the main scanning direction on the surfaces to be scanned. The imaging optical system has a scanning lens group, and a plurality of compensation lenses which are provided for the plurality of beams, respectively, and are provided on the surfaces side with respect to said scanning lens group, the compensation lenses compensating for curvature of field. Further, the light source is arranged such that the plurality of beams emitted by the light source are incident on the polygonal mirror from the outside of the predetermined scanning range in the main scanning direction and are incident on the polygonal mirror with the plurality of beams being inclined in the auxiliary scanning direction with respect to a plane perpendicular to a rotational axis of the polygonal mirror.

In the above configuration, at least one surface of the scanning lens group has a first anamorphic surface, power of the first anamorphic surface in the auxiliary scanning direction is distributed asymmetrically in the main scanning direction with respect to an optical axis of the scanning lens group. Further, power of each surface of the compensation lenses in the auxiliary scanning direction is distributed symmetrically with respect to a center position of the each surface.

With this configuration, inclinations of scanning lines caused by asymmetry of a change of the deflection position can be corrected because the anamorphic surface of the scanning lens group has asymmetry of distribution in the main scanning direction of power in the auxiliary scanning direction.

In a particular case, the first anamorphic surface of the scanning lens group may be symmetrical with respect to a plane perpendicular to the auxiliary scanning direction and including the optical axis, and the compensation lenses include a second anamorphic surface which is asymmetrical with respect to a plane perpendicular to the auxiliary scanning direction and including a center position of the second anamorphic surface.

Alternatively, the first anamorphic surface of the scanning lens group may be configured such that a cross-sectional shape thereof in the main scanning direction is defined as a function of a distance, in the main scanning direction, from the optical axis of said scanning lens group, a cross-sectional shape thereof in the auxiliary scanning direction is formed as an arc, and a curvature in the auxiliary scanning direction is defined as a function of a distance, in the main scanning direction, from the optical axis, the cross-sectional shape in the main scanning direction and the curvature in the auxiliary scanning direction being defined independently from each other.

Optionally, the first anamorphic surface of the scanning lens group may satisfy a condition:

$$|Rz(0)|<|Rz(-Y)|<|Rz(Y)|,$$

where Rz(Y) represents a radius of curvature thereof in the auxiliary scanning direction at a distance Y, the distance Y represents a distance in the main scanning direction with respect to the optical axis, a minus sign of the distance Y corresponds to a side on which the plurality of beam are incident on the polygonal mirror, and a plus sign of the distance Y corresponds to the other side.

In a particular case, one surface of each of the compensation lenses may have an aspherical surface, the aspherical surface being defined as a surface in which a tilt angle of a cross-sectional shape in the auxiliary scanning direction changes with a position in the main scanning direction, the aspherical surface being asymmetrical with respect to a plane perpendicular to the auxiliary scanning direction and including a center position thereof.

Optionally, the aspherical surface of each of the compensation lens may be defined by a two-dimensional polynomial expression in which a SAG amount between a point on the aspherical surface and a plane tangential to the aspherical surface at the center position is defined by coordinates along the main scanning direction and the auxiliary scanning direction.

In a particular case, the scanning lens group may include a single lens having the first anamorphic surface, the single lens being made of plastic.

In a particular case, incident angles of the plurality of beams with respect to the polygonal mirror in the auxiliary scanning direction may be different from each other, all of the plurality of beams passing though said scanning lens group, and each of the compensation lenses is provided for beams of the plurality of beams having substantially the same incident angles with respect to the polygonal mirror.

Optionally, the plurality of beams may include a pair of beams whose incident angles in the auxiliary scanning direction with respect to the polygonal mirror have the same absolute values and have different signs, and configuration of the compensation lenses provided for the pair of beams are equal to each other and are placed so as to be symmetrical with respect to a line extending along the optical axis of the scanning lens group.

In a particular case, the scanning lens group may consist of a single scanning lens.

BRIEF DESCRIPTION OF THE ACCOMPANYING DRAWINGS

FIG. 7 is a graph showing distribution in the main scanning direction of a radius of curvature in an auxiliary scanning direction of a photoconductive drum side surface of a first lens of the scanning lens;

FIG. 8A is a graph showing a bow as to the outer beam in the first example;

FIG. 8B is a graph showing a bow as to the inner beam in the first example;

FIG. 22A is a graph showing a wavefront aberration with regard to an optical system through which the outer beam passes in the second example;

FIG. 22B is a graph showing a wavefront aberration with regard to an optical system through which the inner beam passes in the second example;

FIG. 23 is a developed view of a scanning optical system according to a third example viewed from a line parallel with a rotational axis of a polygonal mirror;

FIG. 36A is a graph showing a bow as to the outer beam in the fourth example;

FIG. 36B is a graph showing a bow as to the inner beam in the fourth example;

FIG. 37A is a graph showing a fθ characteristic with regard to the outer beam in the fourth example;

FIG. 37B is a graph showing a fθ characteristic with regard to the inner beam in the fourth example;

FIG. 38A is a graph showing curvature of field as to the outer beam in the fourth example;

FIG. 38B is a graph showing curvature of field as to the inner beam in the fourth example;

FIG. 39A is a graph showing a change of F number with regard to the outer beam in the fourth example;

FIG. 39B is a graph showing a change of F number with regard to the inner beam in the fourth example.

DETAILED DESCRIPTION OF THE EMBODIMENTS

Hereinafter, an embodiment according to the invention is described with reference to the accompanying drawings.

Figures 1A, 1B:
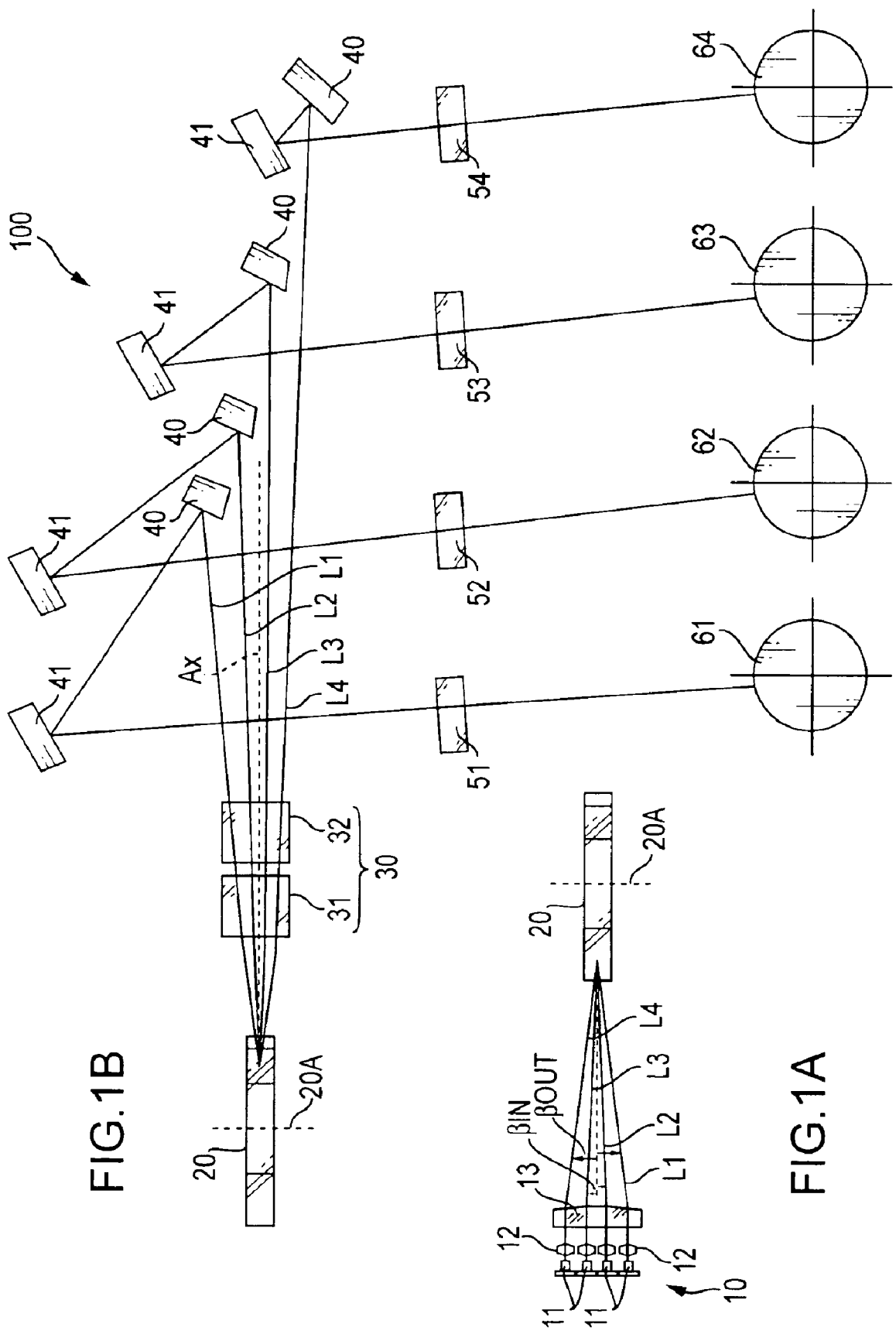
FIG. 1A shows a side view of a light source unit and a polygonal mirror of a scanning optical system to which the present invention is applicable.
FIG. 1B shows a side view of the scanning optical system on a photoconductive drum side thereof.

FIG. 1A shows a side view of a light source unit 10 and a polygonal mirror 20 of a so-called tandem scanning optical system 100 to which the present invention is applicable. FIG. 1B shows a side view of the scanning optical system 100 on a photoconductive drum side thereof.

As shown in FIG. 1A, the light source unit 10 of the scanning optical system 100 includes four laser diodes (11,11, . . . ), and four collimator lenses (12,12, . . . ) which collimate divergent beams emitted by the laser diodes, respectively. As shown in FIG. 1B, the four laser diodes are aligned along a vertical line parallel with an auxiliary scanning direction.

Each of beams L1–L4 collimated by the collimator lens 12 is converged by a cylindrical lens 13 which has a positive power only in the auxiliary scanning direction.

Further, each of the beams L1–L4 is deflected by a prism effect of the cylindrical lens 13, and is incident on a substantially same position on a reflection surface of the polygonal mirror 20. Due to the refraction power of the cylindrical lens 13, a line-like image, which extends in a main scanning direction, is formed on a plane closely adjacent to the reflection surface of the polygonal mirror 20.

As shown in FIG. 1A, incident angles of four laser beams in the auxiliary scanning direction with respect to the polygonal mirror 20 are different from each other. The four beams intersect with each other substantially at the same position on the reflection surface of the polygonal mirror 20. Therefore, the width of the polygonal mirror 20 can be reduced.

Incident angles of inner two beams L2 and L3 in the auxiliary scanning direction with respect to the polygonal mirror 20 are represented by $\pm\beta\text{in}$. Incident angles of outer two beams L1 and L4 in the auxiliary scanning direction with respect to the polygonal mirror 20 are represented by $\pm\beta\text{out}$. That is, incident angles of a pair of inner beams L2 and L3 (or outer beams L1 and L4) in the auxiliary scanning direction with respect to the polygonal mirror 20 have opposite signs and the same absolute values.

As shown in FIG. 1B, the four beams L1–L4 emitted by the laser source unit 10 are simultaneously deflected by the polygonal mirror 20 rotating about its rotational axis 20a.

The laser source unit 10 is arranged such that each laser beam emitted by the laser source unit 10 are incident on the polygonal mirror 20 from the outside of a predetermined scanning range within which each laser beam is deflected by the polygonal mirror 20. The laser beams L1–L4 deflected by the polygonal mirror 20 pass through a scanning lens 30 including a first lens 31 and a second lens 32 with a direction in which each laser beam travels being different from each other in the auxiliary scanning direction.

Each of the laser beams L1–L4 emerged from the scanning lens 30 is reflected by a pair of mirrors 40 and 41, and passes through the corresponding compensation lens 51–54. Then, each beam is converged onto the corresponding photoconductive drum 61–64 to form a scanning beam spot. Therefore, when the polygonal mirror 20 is rotated about the rotational axis 20a, scanning lines are formed on the photoconductive drums 61–64, respectively.

The cylindrical lens 13 functions as an anamorphic optical element that converges a beam emitted by the light source unit 10 in the auxiliary scanning direction. The scanning lens 30 and each of the compensation lenses 51–54 function as an imaging optical system that converges a beam reflected by the polygonal mirror 20 on a surface to be scanned to form a beam spot scanning in the main scanning direction.

One surface of the scanning lens 30 (the photoconductive drum side surface of the first lens 31 or the photoconductive drum side surface of the second lens 32) is formed as an anamorphic aspherical surface whose distribution in the main scanning direction of power in the auxiliary scanning direction is asymmetrical with respect to an optical axis of the scanning lens 30. With this configuration, as described below, an inclination of the scanning line caused by asymmetry of a change of a deflection position (i.e., an intersection between the reflection surface of the polygonal mirror 20 and each laser beam) with respect to the optical axis of the scanning lens 30 can be corrected.

Further, the anamorphic aspherical surface of the scanning lens 30 is formed such that a cross-sectional shape thereof in the main scanning direction is defined as a function of a distance from the optical axis of the scanning lens 30 and is symmetrical with respect to a plane which is perpendicular to the auxiliary scanning direction and includes the optical axis Ax of the scanning lens 30. The cross-sectional shape of the anamorphic surface in the auxiliary scanning direction is formed as an arc whose curvature is defined as a function of a distance from the optical axis Ax.

The anamorphic aspherical surface of the scanning lens 30 is designed to satisfy condition (1):

$$|Rz(0)|<|Rz(-Y)|<|Rz(Y)|$$

where Rz(Y) represents a radius of curvature in the auxiliary scanning direction, Y represents a distance in the main scanning direction from the optical axis Ax, a minus sign of the distance Y corresponds to the light source unit 10 side of the anamorphic aspherical surface, a plus sign of the distance Y corresponds to the other side of the anamorphic aspherical surface.

That is, the anamorphic aspherical surface of the scanning lens 30 has its peak optical power in the auxiliary scanning direction at a center position thereof. The optical power of the anamorphic aspherical surface in the auxiliary scanning direction decreases as a distance from the optical axis Ax increases. Further, radius of curvature of the anamorphic aspherical surface of the scanning lens 30 in the light source unit 10 side is smaller than that of the other side the anamorphic aspherical surface. Therefore, optical power of the light source unit 10 side of the anamorphic aspherical surface in the auxiliary scanning direction is greater than that of the other side of the anamorphic aspherical surface.

Each surface of each of the compensation lenses 51–54 is configured such that distribution in the main scanning direction of optical power in the auxiliary scanning direction is symmetrical with respect to a central point thereof. In addition, one surface of each of the compensation lenses 51–54 is formed as an anamorphic aspherical surface which is asymmetrical with respect to a plane which is perpendicular to the auxiliary scanning direction and includs the central point (i.e., an origin point of a coordinate system in which the surface is defined) thereof. Further, an angle of a tilt of a cross-sectional shape of the anamorphic aspherical surface in a plane parallel with an auxiliary scanning plane changes with positions in the main scanning direction.

The anamorphic aspherical surface of each of the compensation lenses 51–54 is defined by a two-dimensional polynomial expression which defines a SAG amount. More specifically, the SAG amount between a point on the anamorphic aspherical surface and a plane tangential to the anamorphic aspherical surface at the origin point is defined by positions along the main scanning direction and the auxiliary scanning direction. Further, the anamorphic aspherical surface is symmetrical with respect to a line extending in the auxiliary scanning direction and including the origin point thereof. The angle of the tilt of the cross-sectional shape of the anamorphic aspherical surface in the auxiliary scanning direction increases as a distance, in the main scanning direction, from the origin point increases.

The compensation lenses 51 and 54 for the outer beams L1 and L4 are identical, and are arranged such that the compensation lenses 51 and 54 are symmetrical with respect to the optical axis Ax when the scanning optical system 100 is developed. That is, one of the compensation lenses 51 and 54 is placed at a position rotated about the optical axis Ax of the scanning lens 30 with respect to a position of the other compensation lens by an angle of 180° when the scanning optical system 100 is developed. Also, the compensation lenses 52 and 53 for the inner beams are identical, and are arranged such that one of the compensation lenses 52 and 53 is placed at a position rotated about the optical axis Ax of the scanning lens 30 by an angle of 180° with respect to a position of the other compensation lens when the scanning optical system 100 is developed.

Since an angle of each inner beam with respect to the optical axis Ax and an angle of each outer beam with respect to the optical axis Ax are different, the compensation lens 51 (54) for the outer beams has different configuration from the compensation lens 52 (53) for the inner beams. It should be noted that, in the scanning optical system 100, only two kinds of compensation lenses are required.

With the exception of the two-dimensional polynomial aspherical surfaces, the compensation lenses 51–54 are identical with each other.

It should be noted that compensation lenses designed specifically for beams having different incident angles with respect to the polygonal mirror can be used in the scanning optical system 100. However, as described above, only two kinds of the compensation lenses are used in this embodiment. Therefore, kinds of optical elements in the scanning optical system can be decreased.

Since, in this embodiment, the same compensation lenses are arranged so as to be symmetrical with respect to the optical axis of the scanning lens 30, the compensation lenses can not be designed to have asymmetry in the main scanning direction. For this reason, even though a bow of the scanning line is corrected by the compensation lens, an inclination of the scanning line can not be corrected, that is, asymmetry of a bow can not be corrected.

In order to correct asymmetry of the bow of the scanning line, in this embodiment, distribution of optical power of one surface of the scanning lens 30 is designed to have asymmetry in the main scanning direction.

Hereinafter, four concrete examples of the scanning optical system 100 according to the embodiment will be described. In the following examples, the scanning optical system 100 is developed, and therefore, the mirrors 40 and 41 are omitted.

FIRST EXAMPLE

Figure 2:
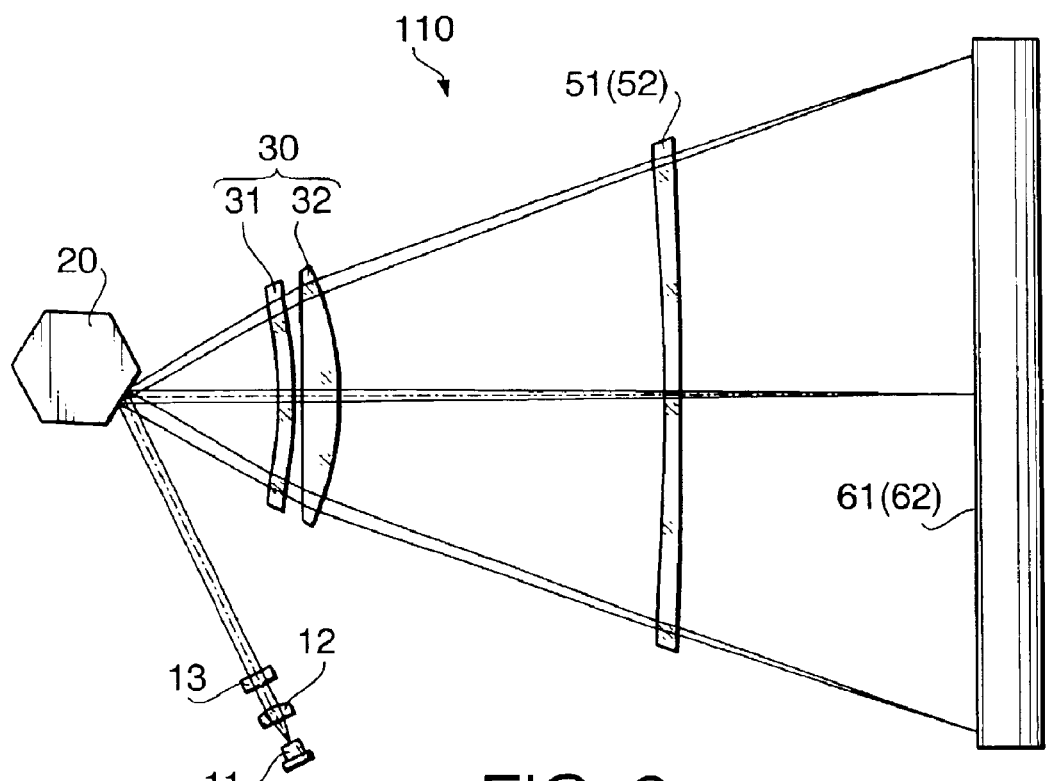
FIG. 2 is a developed view of a scanning optical system according to a first example viewed from a line parallel with a rotational axis of a polygonal mirror.
Figure 3:
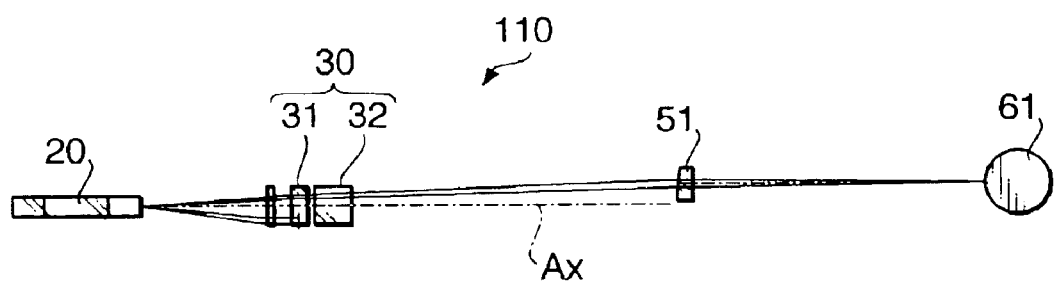
FIG. 3 is a developed view of the scanning optical system of the first example with regard to an outer beam viewed from a line parallel with a main scanning direction.
Figure 4:
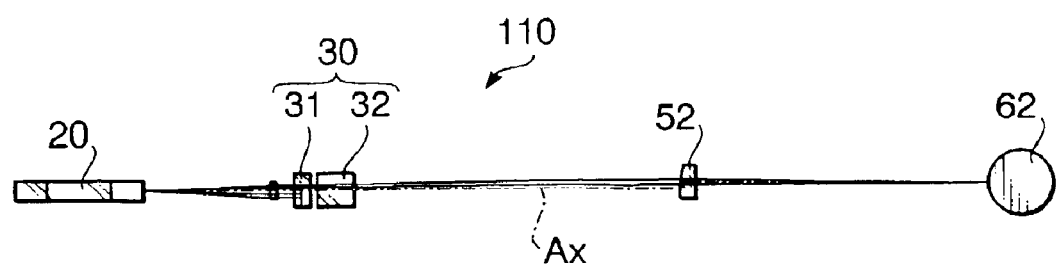
FIG. 4 is a developed view of the scanning optical system of the first example with regard to an inner beam viewed from a line parallel with the main scanning direction.

Each of FIGS. 2–4 shows a scanning optical system 110 according to a first example. FIG. 2 is a developed view of the scanning optical system 110 viewed along a line parallel with the rotational axis of the polygonal mirror 20. FIG. 3 is a developed view of the scanning optical system 110 with regard to the outer beam L1 viewed along a line parallel with the main scanning direction. FIG. 4 is a developed view of the scanning optical system 110 with regard to the inner beam L2 viewed along a line parallel with the main scanning direction.

In FIGS. 2–4, to elements which are similar to those in FIG. 1, the same reference numbers are assigned, and the detailed description thereof will not be repeated. As shown in FIG. 2, in the first example, the scanning lens 30 includes two lenses, i.e., a first lens 31 and a second lens 32. The first lens 31 of the scanning lens 30 is made of plastic, and the second lens 32 is made of glass. Each of the compensation lenses 51–54 is made of plastic.

TABLE 1 indicates a numerical structure of the scanning optical system 110 from the light incident side of the cylindrical lens 13 to the photoconductive drum. In TABLE 1, surfaces #1 and #2 represents surfaces of the cylindrical lens 13, surface #3 is the reflection surface of the polygonal mirror 20, surfaces #4 and #5 represent the first lens 31 of the scanning lens 30, surfaces #6 and #7 represent the second lens 32. Surfaces #8 and #9 represent the compensation lens 51 (54) for the outer beam. Surface #10 represents the photoconductive drum 61(64) for the outer beam. Surfaces #11 and #12 represent the compensation lens 52(53) for the inner beam. Surface #13 represents the photoconductive drum 62(63) for the inner beam.

In TABLE 1, Ry denotes a radius (unit: mm) of curvature in the main scanning direction, Rz denotes a radius (unit: mm) of curvature in the auxiliary scanning direction (If a surface is rotationally symmetrical, no value is indicated). Further, d denotes a distance (unit: mm) between adjacent surfaces on the optical axis Ax, n denotes a refractive index at a design wavelength of 780 nm, and DECZ denotes a decentering amount (unit: mm) of each surface when the scanning optical system 110 is developed. Each incident angle with respect to the polygonal mirror 20 is an angle formed between a central axis of the beam impinging on the reflection surface of the polygonal mirror 20 and a normal of the reflection surface.

TABLE 1 focal length = 200 mm
scanning width = 216 mm
design wavelength = 780 nm
incident angle with respect to polygonal mirror:
 −65° (main scanning direction)
 2.76° (auxiliary scanning direction; outer beam)
 0.92° (auxiliary scanning direction; inner beam)

| Surface | Ry | Rz | d | n | DECZ |
|---|---|---|---|---|---|
| #1 | ∞ | −51.08 | 4.00 | 1.51072 | 0.00 |
| #2 | ∞ | — | 97.00 | — | — |
| #3 | ∞ | — | 48.50 | — | 0.00 |
| #4 | −100.00 | — | 5.00 | 1.48617 | 0.00 |
| #5 | −100.00 | −100.00 | 2.50 | — | — |
| #6 | ∞ | — | 11.50 | 1.51072 | 0.00 |
| #7 | −100.00 | — | 102.50 | — | — |
| #8 | −592.00 | — | 5.00 | 1.48617 | 6.00 |
| #9 | −1800.00 | — | 91.88 | — | — |
| #10 | ∞ | — | 0.00 | — | 6.00 |
| #11 | −592.80 | — | 5.00 | 1.48617 | 2.50 |
| #12 | −1800.00 | — | 91.88 | — | — |
| #13 | ∞ | — | 0.00 | — | 2.08 |

In TABLE 1, surface #1 is a cylindrical surface, surfaces #2 and #3 are planar surfaces, surface #4 is a rotationally symmetrical aspherical surface, surface #5 is an anamorphic aspherical surface. Surface #6 is a planar surface, surface #7 is a spherical surface, surface #8 and #11 are aspherical surfaces defined by two-dimensional polynomial expressions, surface #9 and #12 are spherical surfaces.

The rotationally symmetrical aspherical surface is expressed by following equation:

$$X(h) = \frac{Ch^2}{1 + \sqrt{1 - (1+\kappa)C^2 h^2}} + A_4 h^4 + A_6 h^6 + \ldots \quad (2)$$

where, X(h) represents a SAG amount which is a distance between a point on the aspherical surface at a height of h from the optical axis and a plane tangential to the aspherical surface at the optical axis. C represents a curvature (1/r) on the optical axis. κ represents a conical coefficient, and $A_4$ and $A_6$ are aspherical coefficients of $4^{th}$ and $6^{th}$ orders, respectively. The radii of curvatures of the rotationally symmetrical aspherical surfaces in TABLE 1 are those on the optical axis. Conical coefficients and aspherical coefficients of surface #4 are indicated in TABLE 2.

TABLE 2 surface #4 (rotationally symmetrical aspherical surface)

| κ | 0.00 |
|---|---|
| $A_4$ | 1.58 × 10$^{-6}$ |
| $A_6$ | 2.39 × 10$^{-10}$ |

The anamorphic aspherical surface is defined by the following equation.

$$X(Y) = \frac{CY^2}{1 + \sqrt{1 - (1+\kappa)C^2 Y^2}} + \sum_{n=1} AM_n Y^n \quad (3)$$

$$C_Z(Y) = C_{Z0} + \sum_{n=1} AS_n Y^n \quad (4)$$

where, X(Y) is a SAG amount which is obtained as a function of a coordinate Y extending in the main scanning direction. The SAG amount X(Y) represents a distance between a plane tangential to the anamorphic aspherical surface at the optical axis and a point on a curved line extending along the anamorphic aspherical surface in the main scanning direction and passing the optical axis thereof. Further, Cz(Y) represents a curvature (1/Rz) of an arc extending in the auxiliary scanning direction, the arc is intersecting the curved line at the point whose coordinate is Y. C represents a curvature (1/r) of the anamorphic aspherical surface in the main scanning direction at the optical axis. κ represents a conical coefficient, and $AM_n$ is an aspherical coefficient of $n^{th}$ order. $AS_n$ is an aspherical coefficient of $n^{th}$ order for determining the curvature in the auxiliary scanning direction.

Values of the coefficients for the surface #5 are indicated in TABLE 3.

TABLE 3 surface #5 (anamorphic aspherical surface)
κ = 0.000

| $AM_1$ = 0.00 | $AS_1$ = 6.44 × 10$^{-6}$ |
|---|---|
| $AM_2$ = −1.49 × 10$^{-5}$ | $AS_2$ = 7.57 × 10$^{-6}$ |
| $AM_3$ = 0.00 | $AS_3$ = 1.80 × 10$^{-8}$ |
| $AM_4$ = 1.53 × 10$^{-6}$ | $AS_4$ = −1.71 × 10$^{-9}$ |
| $AM_5$ = 0.00 | $AS_5$ = −1.34 × 10$^{-11}$ |
| $AM_6$ = 1.86 × 10$^{-10}$ | $AS_6$ = 1.01 × 10$^{-12}$ |

The aspherical surface defined by a two-dimensional polynomial expression is expressed by:

$$X(Y, Z) = \frac{Ch^2}{1 + \sqrt{1 - (1+\kappa)C^2 h^2}} + \sum_{n=0} \sum_{m=0} B_{mn} Y^m Z^n \quad (5)$$

where, X(Y,Z) is a SAG amount which is defined by coordinate axes correspond to the main scanning direction (Y axis) and the auxiliary scanning direction (Z axis). X(Y,Z) is a distance between a point (X,Y) on the aspherical surface and a plane tangential to the aspherical surface at a center position (an origin point) thereof. C represents a curvature (1/Ry) in the main scanning direction at the center position. κ represents a conical coefficient, h is a distance from the center position of the aspherical surface (h=$(Y^2+Z^2)^{1/2}$). $B_{mn}$ is an aspherical coefficient (m is an order as to the main scanning direction, n is an order as to the auxiliary scanning direction). If $B_{mn}$ whose numerical subscript n is an odd number has a value other than zero, the aspherical surface becomes asymmetrical with respect to a plane perpendicular to the auxiliary scanning direction and including the center position thereof.

Values of the coefficients for the aspherical surface defined by the two-dimensional polynomial expression formed on the compensation lens 51 for the outer beam are indicated in TABLE 4. Values of the coefficients for the aspherical surface defined by the two-dimensional polynomial expression formed on the compensation lens 52 for the inner beam are indicated in TABLE 5.

TABLE 4 surface #8 for the outer beams

| $B_{mn}$ | N = 0 | n = 1 | n = 2 | n = 3 | n = 4 |
|---|---|---|---|---|---|
| m = 0 | — | $6.252 \times 10^{-2}$ | $1.654 \times 10^{-2}$ | $-3.163 \times 10^{-5}$ | $-4.542 \times 10^{-8}$ |
| m = 2 | $-2.529 \times 10^{-5}$ | $-5.921 \times 10^{-7}$ | $-2.926 \times 10^{-7}$ | $3.867 \times 10^{-10}$ | $6.112 \times 10^{-11}$ |
| m = 4 | $8.247 \times 10^{-8}$ | $-1.440 \times 10^{-10}$ | $-8.264 \times 10^{-12}$ | $-4.133 \times 10^{-13}$ | $4.668 \times 10^{-15}$ |
| m = 6 | $-5.177 \times 10^{-12}$ | $9.335 \times 10^{-15}$ | $1.558 \times 10^{-15}$ | $-4.333 \times 10^{-17}$ | 0.000 |
| m = 8 | $2.565 \times 10^{-16}$ | 0.000 | 0.000 | 0.000 | 0.000 |

TABLE 5 surface #11 for the inner beams

| $B_{mn}$ | N = 0 | n = 1 | n = 2 | n = 3 | n = 4 |
|---|---|---|---|---|---|
| m = 0 | — | $3.523 \times 10^{-2}$ | $1.658 \times 10^{-2}$ | $-2.044 \times 10^{-5}$ | $-3.797 \times 10^{-8}$ |
| m = 2 | $-2.692 \times 10^{-5}$ | $-4.567 \times 10^{-7}$ | $-2.933 \times 10^{-7}$ | $2.130 \times 10^{-9}$ | $7.696 \times 10^{-12}$ |
| m = 4 | $8.239 \times 10^{-8}$ | $-6.120 \times 10^{-11}$ | $-1.323 \times 10^{-11}$ | $-1.552 \times 10^{-13}$ | $1.316 \times 10^{-15}$ |
| m = 6 | $-4.884 \times 10^{-12}$ | $4.911 \times 10^{-15}$ | $1.823 \times 10^{-15}$ | $-6.438 \times 10^{-17}$ | 0.000 |
| m = 8 | $2.314 \times 10^{-16}$ | 0.000 | 0.000 | 0.000 | 0.000 |

Figure 5:
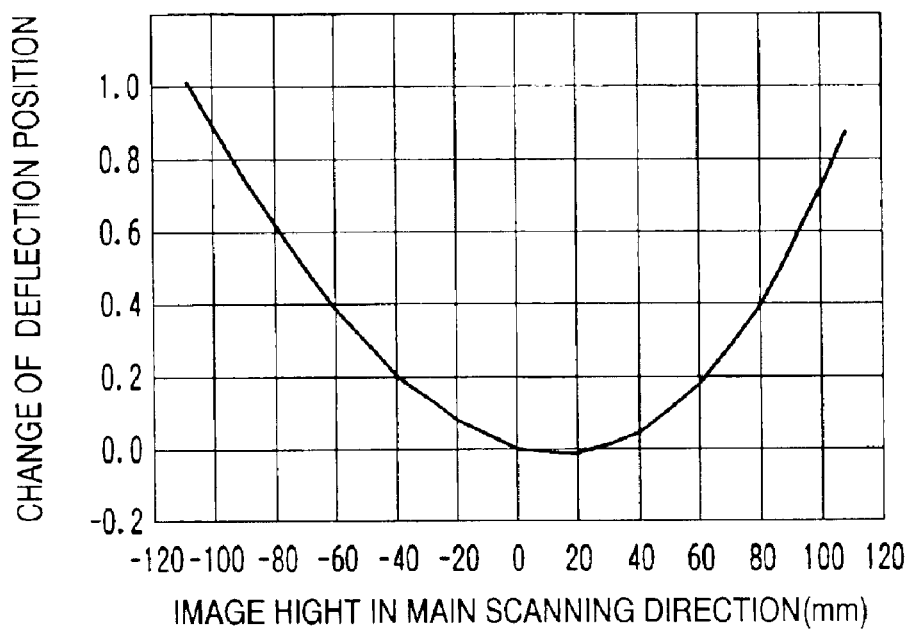
FIG. 5 is a graph showing a change of a deflection position during rotation of the polygonal mirror according to the first example.
Figure 6:
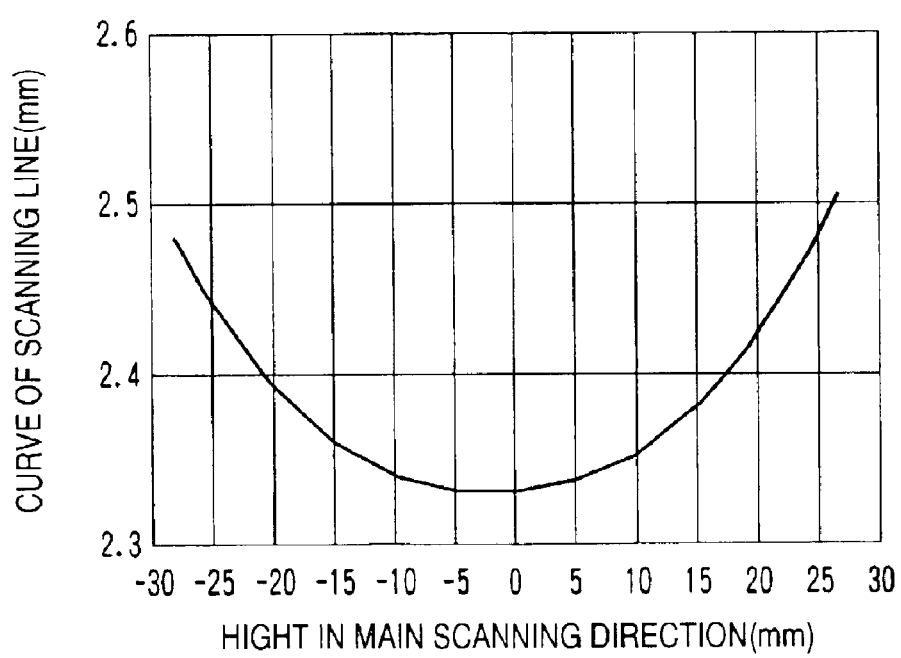
FIG. 6 is a graph showing a bow which is caused because a beam incident on the polygonal mirror is inclined with respect to a plane perpendicular to a rotational axis of the polygonal mirror.

FIG. 5 is a graph showing a change of the deflection position during rotation of the polygonal mirror 20 according to the first example. As can be seen from FIG. 5, the change of the deflection position in the main scanning direction is asymmetrical with respect to the optical axis. FIG. 6 is a graph showing a bow which is caused because the beam incident on the polygonal mirror is inclined with respect to a plane perpendicular to the rotational axis of the polygonal mirror 20. FIG. 6 shows a bow on the polygonal mirror side surface of the first lens 31 of the scanning lens 30. FIG. 6 shows a locus of the outer beams. As can be seen from FIG. 6, the bow is asymmetrical with respect to the optical axis.

In the first example, as shown in FIG. 7, the photoconductive drum side surface of the first lens 31 of the scanning lens 30 is designed such that distribution in the main scanning direction of power in the auxiliary scanning direction is asymmetrical with respect to the optical axis in order to correct asymmetry of a curve of the scanning line (i.e., asymmetry of a bow). FIG. 7 is a graph showing distribution in the main scanning direction of a radius of curvature of the photoconductive drum side surface of the first lens 31 in the auxiliary scanning direction. As a result, as shown in FIGS. 8A and 8B, a curve of the scanning line is sufficiently suppressed. FIG. 8A is a graph showing a curve of the scanning line (i.e., a bow) with regard to the outer beam L1. FIG. 8B is a graph showing a curve of the scanning line (i.e., a bow) with regard to the inner beam L2.

Figure 9A:
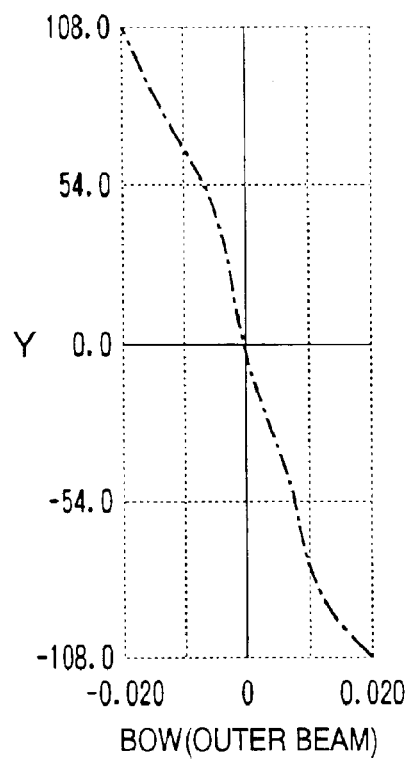
FIG. 9A is a graph showing a bow as to the outer beam in a comparison example.
Figure 9B:
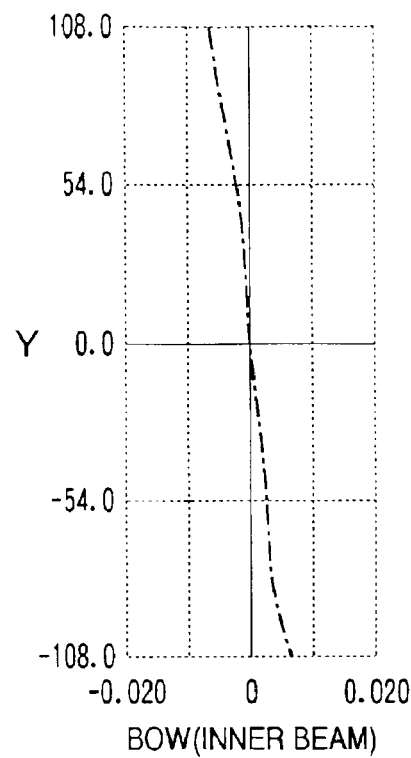
FIG. 9B is a graph showing a bow as to the inner beam in the comparison example.

Each of FIGS. 9A and 9B is a graph showing a curve of a scanning line in a comparison example in which the scanning lens 30 is configured not to have asymmetry in the main scanning direction. FIG. 9A is a graph showing a curve of a scanning line (i.e., a bow) with regard to the outer beam L1. FIG. 9B is a graph showing a curve of a scanning line (i.e., a bow) with regard to the inner beam L2. In this comparison example, distribution in the main scanning direction of power in the auxiliary scanning direction of the photoconductive drum side surface of the first lens 31 of the scanning lens 30 (i.e., surface #5) is symmetrical with respect to the optical axis. In this comparison example, surface #5 which is the anamorphic aspherical surface expressed by the equations (3) and (4) is defined by aspherical coefficients of odd-numbered orders AS1, AS3 and AS5 whose values are all zero. In the comparison example, configuration except for surface #5 is equal to the first example. As can be seen from FIGS. 9A and 9B, if the scanning lens 30 is configured not to have asymmetry in the main scanning direction, the inclination of the scanning line can not be corrected even though the bow is corrected to a certain extent.

Figure 10A:
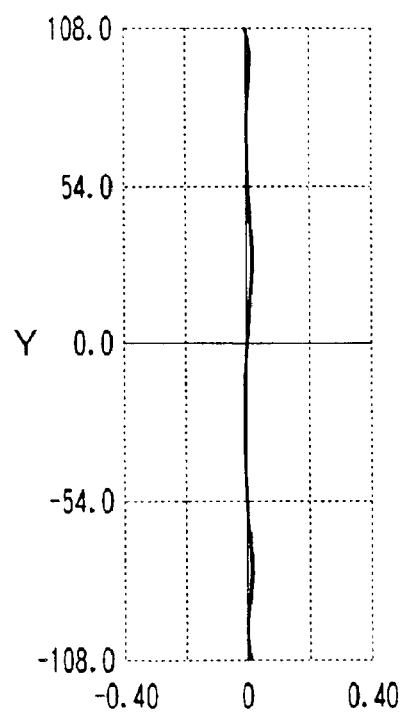
FIG. 10A is a graph showing a fθ characteristic with regard to the outer beam in the first example.
Figure 10B:
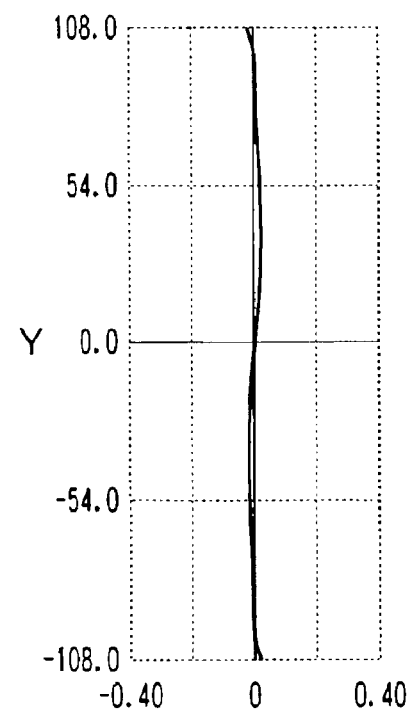
FIG. 10B is a graph showing a fθ characteristic with regard to the inner beam in the first example.
Figure 11A:
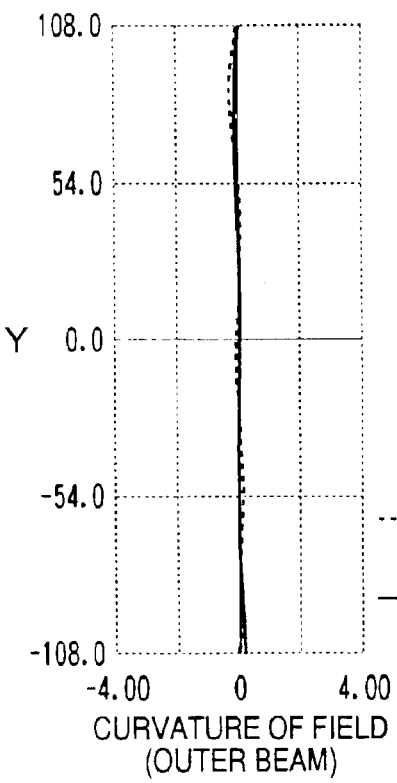
FIG. 11A is a graph showing curvature of field as to the outer beam in the first example.
Figure 11B:
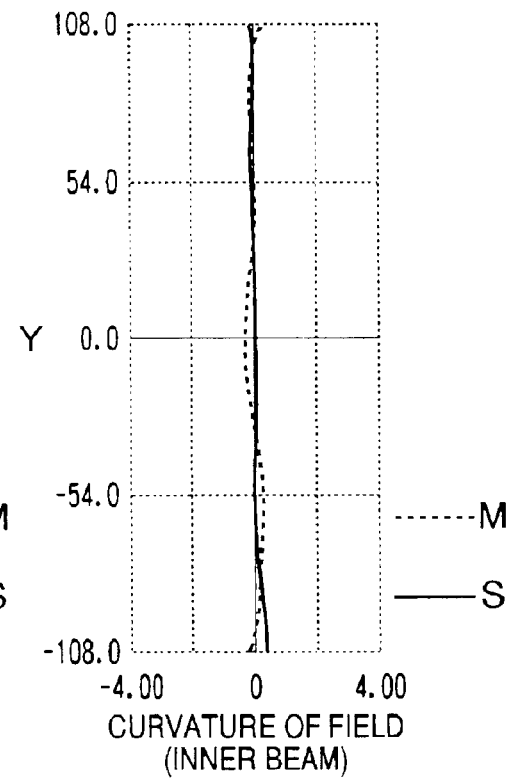
FIG. 11B is a graph showing curvature of field as to the inner beam in the first example.

FIGS. 10A–13B show the other aberrations in the scanning optical system 110 according to the first embodiment. FIGS. 10A and 10B are graphs showing fθ characteristics with regard to the outer beam and the inner beam, respectively. FIG. 11A is a graph showing curvature of field with regard to the outer beam. FIG. 11B is a graph showing curvature of field with regard to the inner beam. FIG. 12A is a graph showing a change of F number with regard to the outer beam. FIG. 12B is a graph showing a change of F number with regard to the inner beam. In each of FIGS. 11A–12B, a broken line M and a solid line S show characteristics as to the main scanning direction and the auxiliary scanning direction, respectively.

Figure 13A:
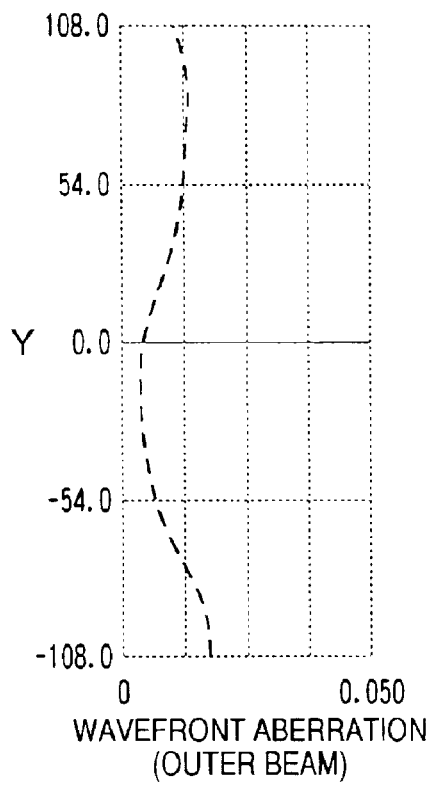
FIG. 13A is a graph showing a wavefront aberration with regard to an optical system through which the outer beam passes in the first example.
Figure 13B:
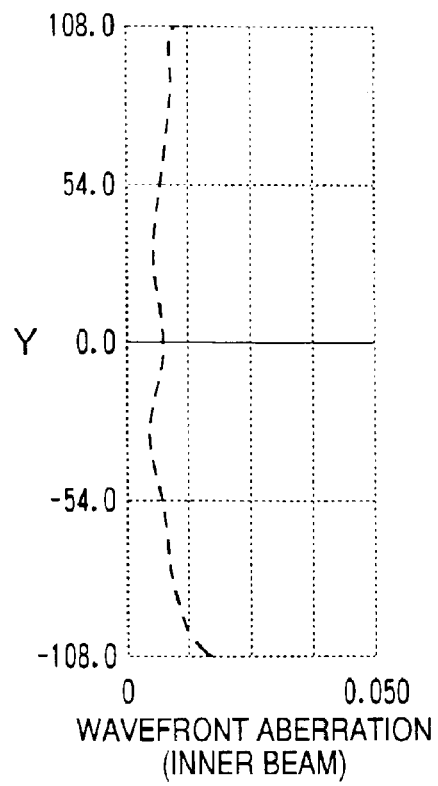
FIG. 13B is a graph showing a wavefront aberration with regard to an optical system through which the inner beam passes in the first example.

FIG. 13A is a graph showing a wavefront aberration with regard to an optical system through which the outer beam passes. FIG. 13B is a graph showing a wavefront aberration with regard to an optical system through which the inner beam passes.

Figure 12A:
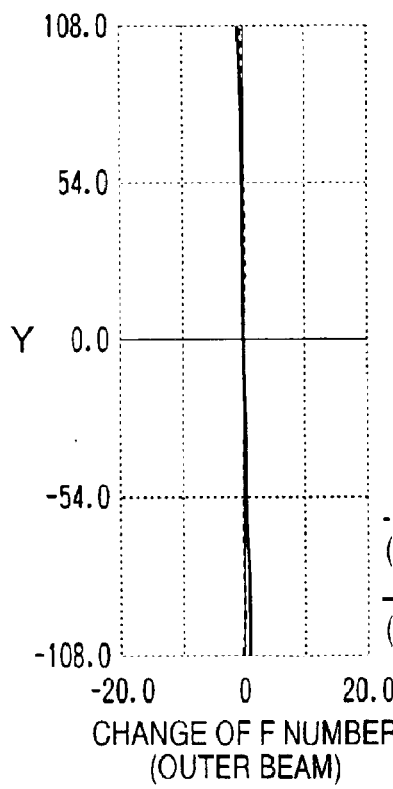
FIG. 12A is a graph showing a change of F number with regard to the outer beam in the first example.
Figure 12B:
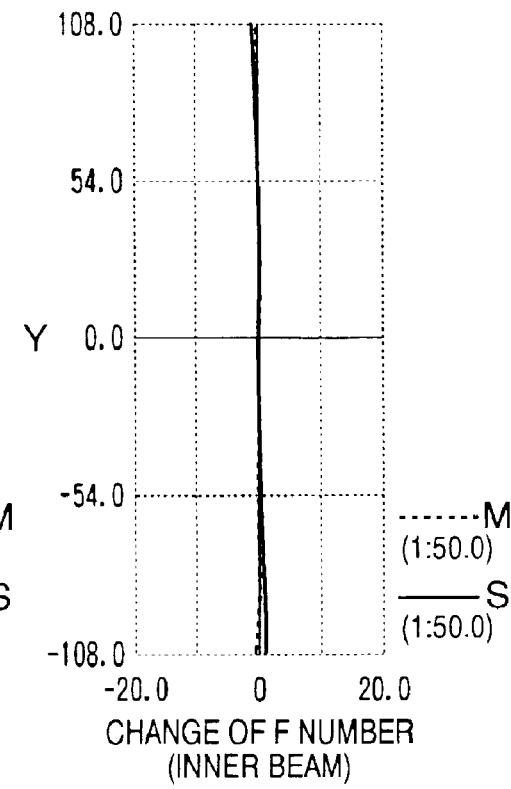
FIG. 12B is a graph showing a change of F number with regard to the inner beam in the first example.

In each graph, the longitudinal axis represents an image height (unit: mm), and the horizontal axis represents an amount of aberration. The unit of the amount of aberration in each of FIGS. 8A–11B is a millimeter. The unit of the amount of aberration in each of FIGS. 12A and 12B is a percent. The unit of the amount of aberration in each of FIGS. 13A and 13B is a wavelength.

As shown in FIGS. 8A–13B, the scanning optical system 110 according to the first example can compensate for a bow and a inclination of a bow while satisfying essential characteristics for a scanning optical system such as a fθ characteristic, correction of a curvature of field. Further, as shown in FIGS. 13A and 13B, according to the first example, a fluctuation of a wavefront is sufficiently suppressed.

SECOND EXAMPLE

Figure 14:
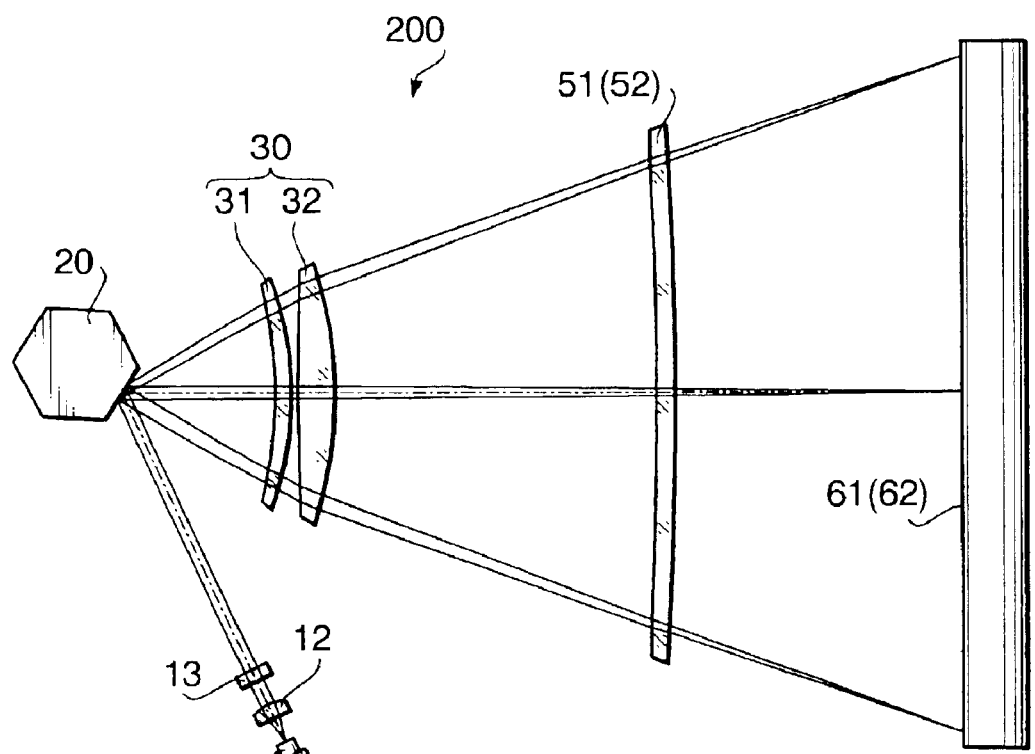
FIG. 14 is a developed view of a scanning optical system according to a second example viewed from a line parallel with a rotational axis of a polygonal mirror.
Figure 15:
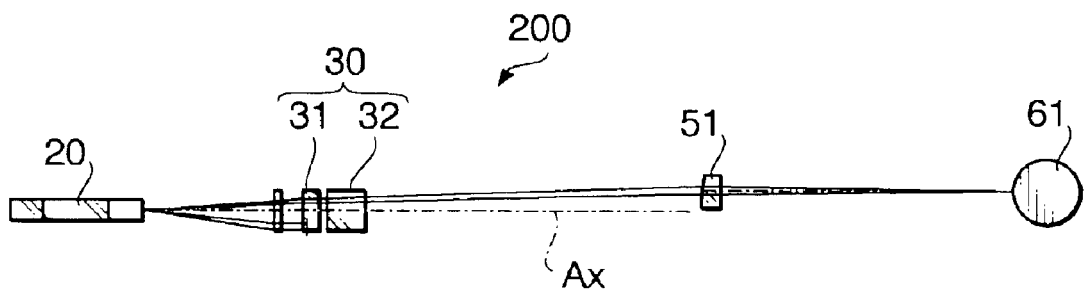
FIG. 15 is a developed view of the scanning optical system of the second example with regard to an outer beam viewed from a line parallel with a main scanning direction.
Figure 16:
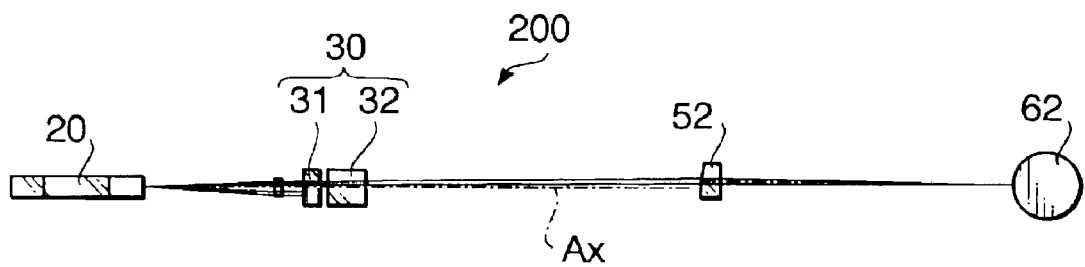
FIG. 16 is a developed view of the scanning optical system of the second example with regard to an inner beam viewed from a line parallel with the main scanning direction.

FIGS. 14–16 show a scanning optical system 200 according to a second example. FIG. 14 is a developed view of the scanning optical system 200 viewed along a line parallel with the rotational axis of the polygonal mirror 20. FIG. 15 is a developed view of the scanning optical system 200 with regard to the outer beam L1 viewed along a line parallel with the main scanning direction. FIG. 16 is a developed view of the scanning optical system 200 with regard to the inner beam L2 viewed along a line parallel with the main scanning direction.

In FIGS. 14–16, to elements which are similar to those in FIG. 1, the same reference numbers are assigned, and the detailed description thereof will not be repeated. As shown in FIG. 14, in the scanning optical system 200, the scanning lens 30 includes the first lens 31 and the second lens 32. Each of the first lens 31, second lens 32 and the compensation lenses 51–54 is made of plastic.

TABLE 6 indicates a numerical structure of the scanning optical system 200 from the light incident side of the cylindrical lens 13 to the photoconductive drum. In TABLE 6, surfaces #1 and #2 represents surfaces of the cylindrical lens 13, surface #3 is the reflection surface of the polygonal mirror 20, surfaces #4 and #5 represent the first lens 31 of the scanning lens 30, surfaces #6 and #7 represent the second lens 32. Surfaces #8 and #9 represent the compensation lens 51(54) for the outer beam. Surface #10 represents the photoconductive drum 61(64) for the outer beam. Surfaces #11 and #12 represent the compensation lens 52(53) for the inner beam. Surface #13 represents the photoconductive drum 62(63) for the inner beam. Each symbol in TABLE 6 has the same meaning as that in TABLE 1.

TABLE 6 focal length = 200 mm
scanning width = 216 mm
design wavelength = 780 nm
incident angle with respect to polygonal mirror
 −65° (main scanning direction)
 2.76° (auxiliary scanning direction; outer beam)
 0.92° (auxiliary scanning direction; inner beam)

| Surface | Ry | Rz | d | n | DECZ |
|---|---|---|---|---|---|
| #1 | ∞ | −51.08 | 4.00 | 1.51072 | 0.00 |
| #2 | ∞ | — | 97.00 | — | — |
| #3 | ∞ | — | 48.50 | — | 0.00 |
| #4 | −100.00 | — | 5.00 | 1.48617 | 0.00 |
| #5 | −100.00 | — | 2.50 | — | — |
| #6 | ∞ | — | 11.50 | 1.48617 | 0.00 |

TABLE 6-continued

| | | | | | |
|---|---|---|---|---|---|
| #7 | −100.00 | −100.00 | 102.50 | — | — |
| #8 | −653.70 | — | 5.00 | 1.48617 | 6.00 |
| #9 | −1800.00 | — | 92.02 | — | — |
| #10 | ∞ | — | 0.00 | — | 5.55 |
| #11 | −648.40 | — | 5.00 | 1.48617 | 2.50 |
| #12 | −1800.00 | — | 92.07 | — | — |
| #13 | ∞ | — | 0.00 | — | 1.89 |

In TABLE 6, surface #1 is a cylindrical surface, surfaces #2 and #3 are planar surfaces, surface #4 is a rotationally symmetrical aspherical surface, and surface #5 is a spherical surface. Surface #6 is a planar surface, surface #7 is an anamorphic aspherical surface, surface #8 and #11 are aspherical surfaces defined by two-dimensional polynomial expressions, surfaces #9 and #12 are spherical surfaces.

Conical coefficients and aspherical coefficients for the surface #4 are indicated in TABLE 7.

TABLE 7 surface #4 (rotationally symmetrical aspherical surface)

| κ | 0.00 |
|---|---|
| $A_4$ | $1.16 \times 10^{-6}$ |
| $A_6$ | $-1.25 \times 10^{-10}$ |

Values of the coefficients for the anamorphic aspherical surface #7 are indicated in TABLE 8.

TABLE 8 surface #7 (anamorphic aspherical surface)
κ = 0.000

| $AM_1 = 0.00$ | $AS_1 = 4.64 \times 10^{-6}$ |
|---|---|
| $AM_2 = -6.13 \times 10^{-6}$ | $AS_2 = 2.94 \times 10^{-6}$ |
| $AM_3 = 0.00$ | $AS_3 = 6.85 \times 10^{-9}$ |
| $AM_4 = 8.71 \times 10^{-7}$ | $AS_4 = -1.32 \times 10^{-9}$ |
| $AM_5 = 0.00$ | $AS_5 = -3.56 \times 10^{-12}$ |
| $AM_6 = -4.72 \times 10^{-11}$ | $AS_6 = -3.34 \times 10^{-13}$ |

Values of the coefficients for the surface #8 of the compensation lens 51 and the surface #11 of the compensation lens 52 are indicated in TABLE 9 and TABLE 10, respectively.

TABLE 9 surface #8 for the outer beams

| $B_{mn}$ | n = 0 | n = 1 | n = 2 | n = 3 | n = 4 |
|---|---|---|---|---|---|
| m = 0 | — | $7.245 \times 10^{-2}$ | $1.645 \times 10^{-2}$ | $-1.233 \times 10^{-5}$ | $-2.100 \times 10^{-7}$ |
| m = 2 | $-9.708 \times 10^{-6}$ | $-9.270 \times 10^{-7}$ | $-3.044 \times 10^{-7}$ | $-9.591 \times 10^{-10}$ | $-1.773 \times 10^{-11}$ |

TABLE 9-continued surface #8 for the outer beams

| $B_{mn}$ | n = 0 | n = 1 | n = 2 | n = 3 | n = 4 |
|---|---|---|---|---|---|
| m = 4 | $1.111 \times 10^{-7}$ | $-1.791 \times 10^{-10}$ | $-1.080 \times 10^{-11}$ | $-2.247 \times 10^{-13}$ | $-5.992 \times 10^{-15}$ |
| m = 6 | $-6.350 \times 10^{-12}$ | $1.311 \times 10^{-14}$ | $1.753 \times 10^{-15}$ | $-5.836 \times 10^{-17}$ | $-1.122 \times 10^{-19}$ |
| m = 8 | $2.293 \times 10^{-16}$ | 0.000 | 0.000 | 0.000 | 0.000 |

TABLE 10 surface #11 for the inner beams

| $B_{mn}$ | n = 0 | N = 1 | n = 2 | n = 3 | n = 4 |
|---|---|---|---|---|---|
| m = 0 | — | $3.940 \times 10^{-2}$ | $1.651 \times 10^{-2}$ | $-1.372 \times 10^{-5}$ | $-1.282 \times 10^{-7}$ |
| m = 2 | $1.912 \times 10^{-6}$ | $-5.986 \times 10^{-7}$ | $-2.982 \times 10^{-7}$ | $2.226 \times 10^{-9}$ | $-1.987 \times 10^{-11}$ |
| m = 4 | $1.116 \times 10^{-7}$ | $-7.569 \times 10^{-11}$ | $1.707 \times 10^{-11}$ | $-1.593 \times 10^{-13}$ | $-8.401 \times 10^{-15}$ |
| m = 6 | $-6.244 \times 10^{-12}$ | $6.436 \times 10^{-15}$ | $2.136 \times 10^{-15}$ | $-5.594 \times 10^{-17}$ | $-1.385 \times 10^{-19}$ |
| m = 8 | $2.158 \times 10^{-16}$ | 0.000 | 0.000 | 0.000 | 0.000 |

Figure 17:
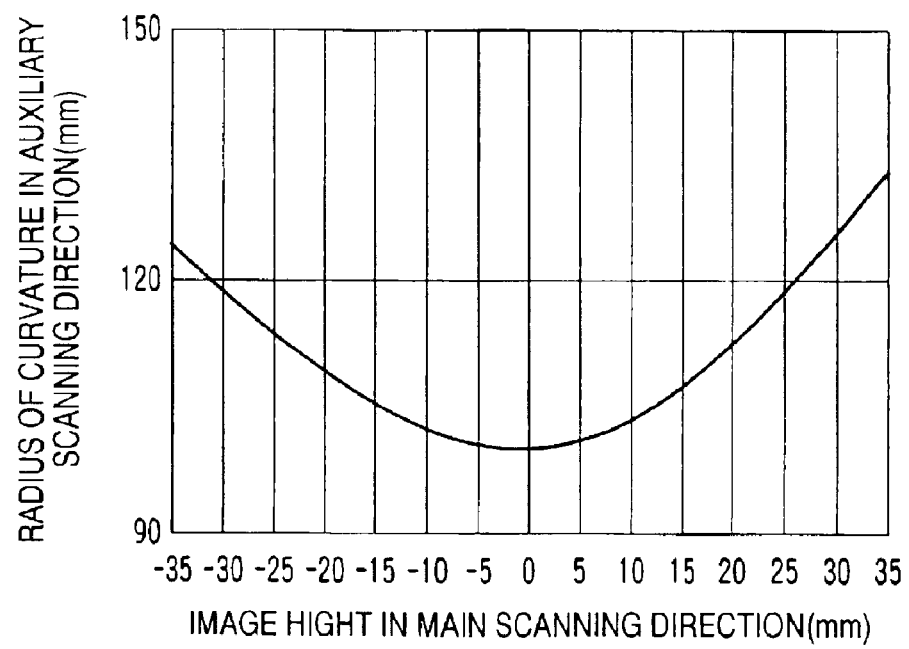
FIG. 17 is a graph showing distribution in the main scanning direction of a radius of curvature in the auxiliary scanning direction of the photoconductive drum side surface of a second lens of a scanning lens in the second example.
Figure 18A:
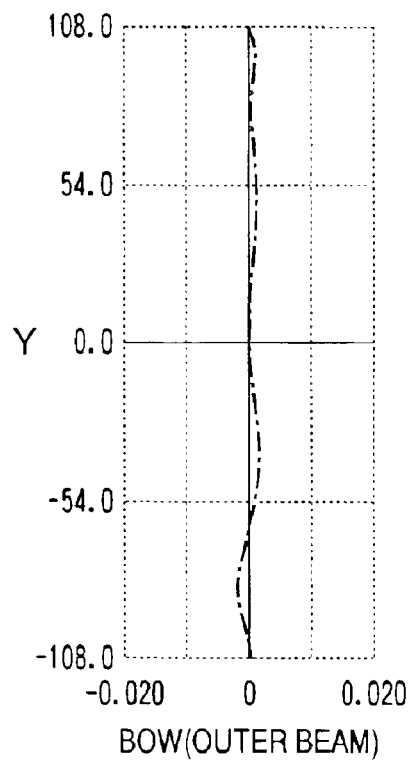
FIG. 18A is a graph showing a bow as to the outer beam in the second example.
Figure 18B:
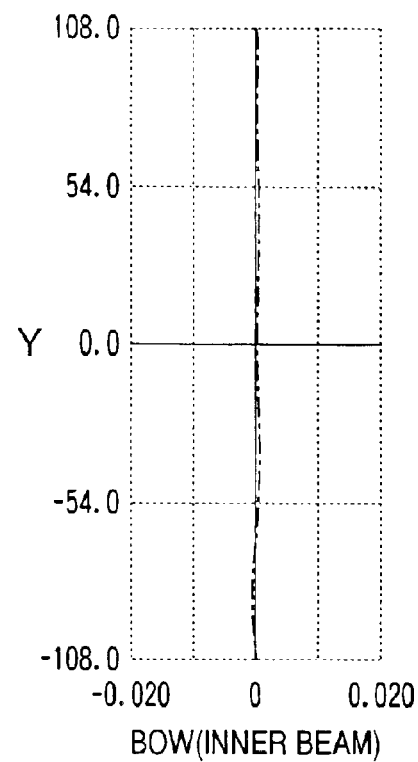
FIG. 18B is a graph showing a bow as to the inner beam in the second example.

In this second example, distribution in the main scanning direction of power in the auxiliary scanning direction of the photoconductive drum side surface (i.e., surface #7) of the second lens 32 has asymmetry with respect to the optical axis as shown in FIG. 17. FIG. 17 is a graph showing distribution in the main scanning direction of a radius of curvature of the photoconductive drum side surface of the second lens 32 in the auxiliary scanning direction. Therefore, asymmetry in a curve of the scanning line is corrected. As a result, a curve of the scanning line (i.e., a bow) is sufficiently suppressed as shown in FIGS. 18A and 18B. FIG. 18A is a graph showing a bow with regard to an optical system through which the outer beam passes. FIG. 18B is a graph showing a bow with regard to an optical system through which the inner beam passes.

Figure 19A:
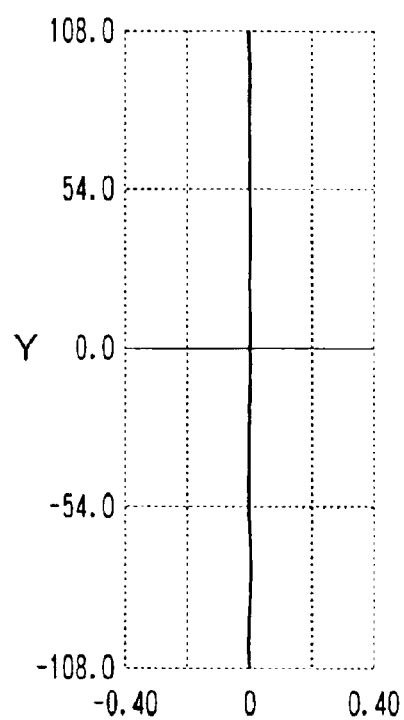
FIG. 19A is a graph showing a fθ characteristic with regard to the outer beam in the second example.
Figure 19B:
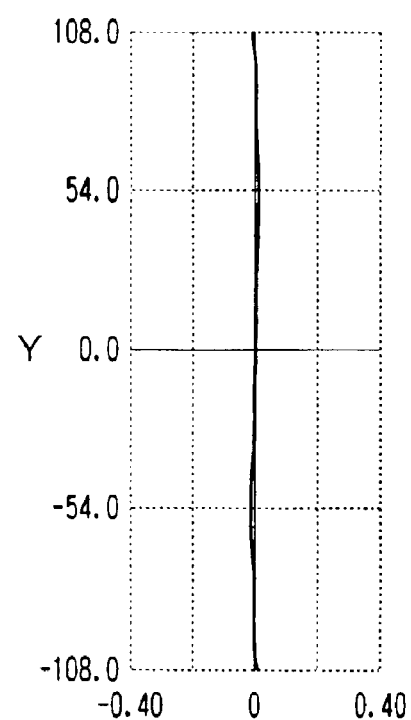
FIG. 19B is a graph showing a fθ characteristic with regard to the inner beam in the second example.
Figure 20A:
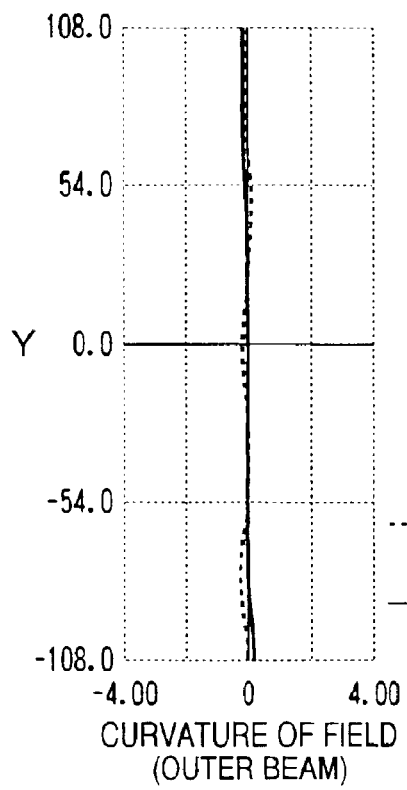
FIG. 20A is a graph showing curvature of field as to the outer beam in the second example.
Figure 20B:
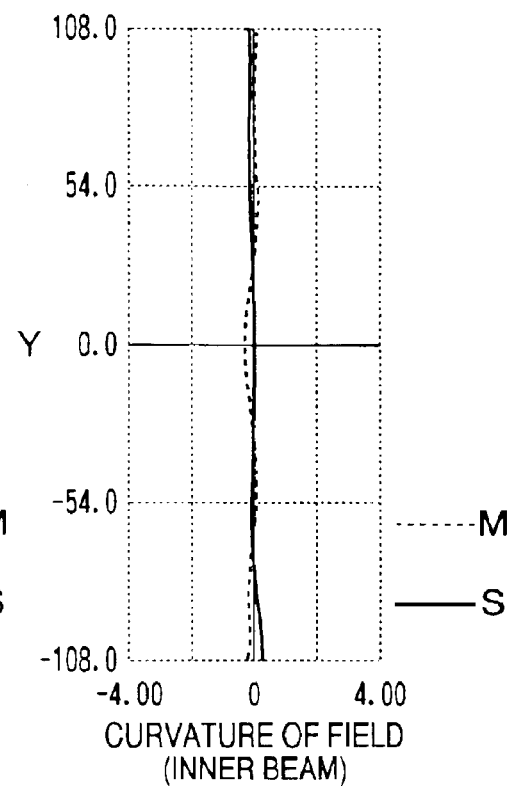
FIG. 20B is a graph showing curvature of field as to the inner beam in the second example.

FIGS. 19A–22B show the other aberrations in the scanning optical system 200 according to the second example. FIGS. 19A and 19B are graphs showing fθ characteristics with regard to the outer beam and the inner beam, respectively. FIG. 20A is a graph showing curvature of field with regard to the outer beam. FIG. 20B is a graph showing curvature of field with regard to the inner beam. FIG. 21A is a graph showing a change of F number with regard to the outer beam. FIG. 21B is a graph showing a change of F number with regard to the inner beam. In each of the FIGS. 20A–21B, a broken line M and a solid line S show characteristics as to the main scanning direction and the auxiliary scanning direction, respectively.

FIG. 22A is a graph showing a wavefront aberration with regard to an optical system through which the outer beam passes. FIG. 22B is a graph showing a wavefront aberration with regard to an optical system through which the inner beam passes.

Figure 21A:
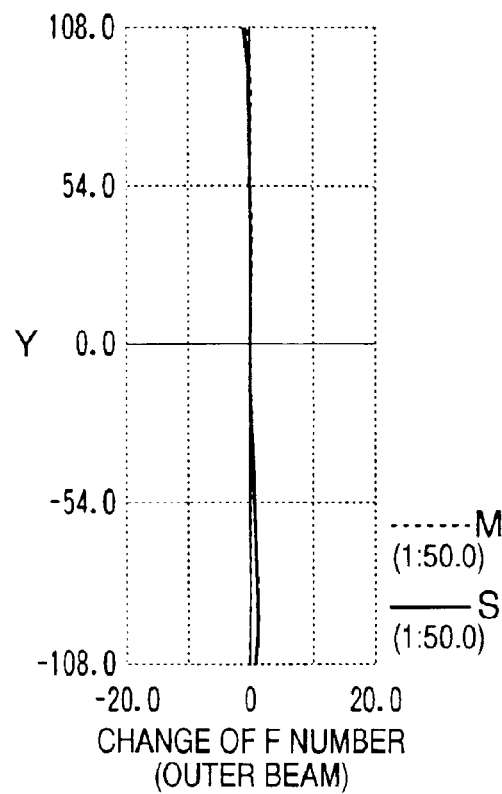
FIG. 21A is a graph showing a change of F number with regard to the outer beam in the second example.
Figure 21B:
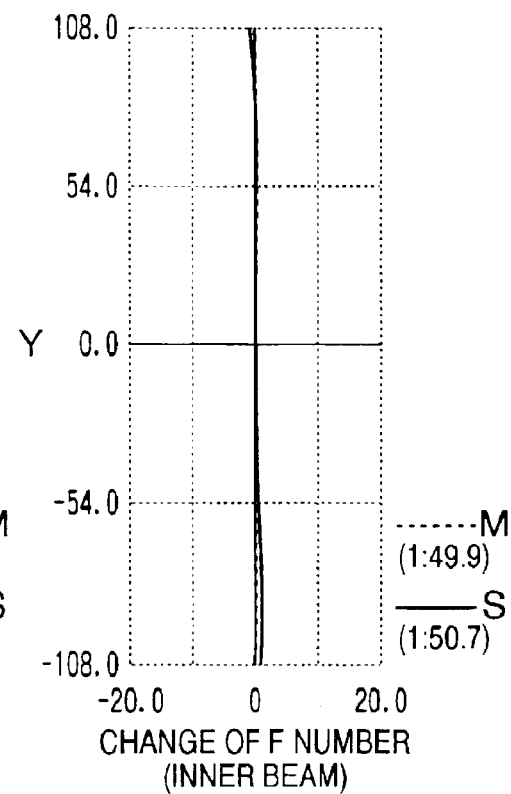
FIG. 21B is a graph showing a change of F number with regard to the inner beam in the second example.

In each graph, the longitudinal axis represents an image height (unit: mm), and the horizontal axis represents an amount of aberration. The unit of the amount of aberration in each of FIGS. 18A–20B is a millimeter. The unit of the amount of aberration in each of FIGS. 21A and 21B is a percent. The unit of the amount of aberration in each of FIGS. 22A and 22B is a wavelength.

As shown in FIGS. 18A–22B, the scanning optical system 200 according to the second example can compensate for a bow and an inclination of a bow while satisfying essential characteristics for a scanning optical system such as a fθ characteristic, correction of a curvature of field.

THIRD EXAMPLE

Figure 24:
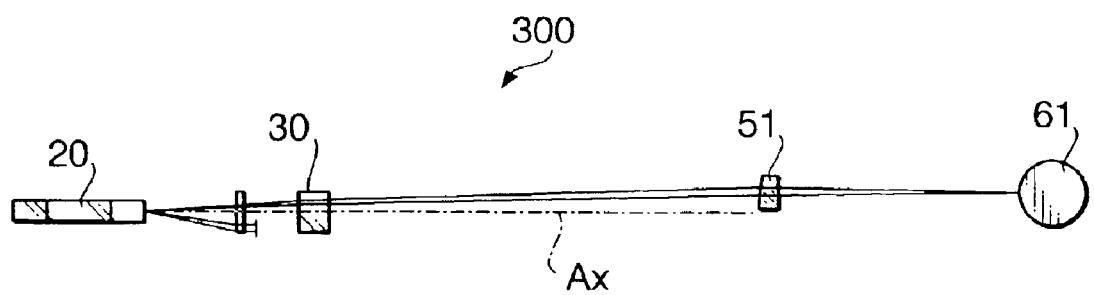
FIG. 24 is a developed view of the scanning optical system of the third example with regard to an outer beam viewed from a line parallel with a main scanning direction.
Figure 25:
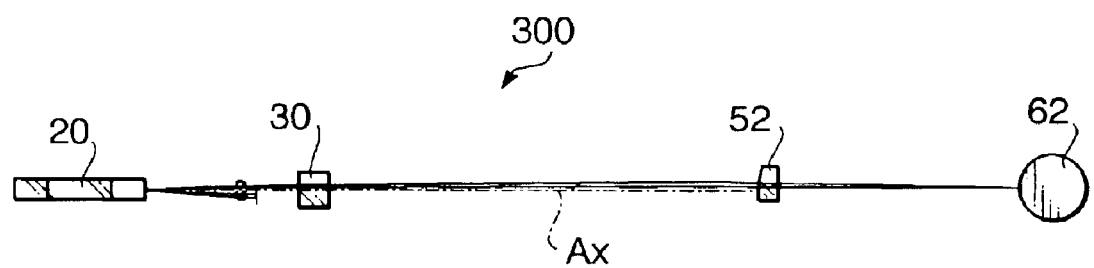
FIG. 25 is a developed view of the scanning optical system of the third example with regard to an inner beam viewed from a line parallel with the main scanning direction.

FIGS. 23–25 show a scanning optical system 300 according to a third example. FIG. 23 is a developed view of the scanning optical system 300 viewed along a line parallel with the rotational axis of the polygonal mirror 20. FIG. 24 is a developed view of the scanning optical system 300 with regard to the outer beam L1 viewed along a line parallel with the main scanning direction. FIG. 25 is a developed view of the scanning optical system 300 with regard to the inner beam L2 viewed along a line parallel with the main scanning direction.

In FIGS. 23–25, to elements which are similar to those in FIG. 1, the same reference numbers are assigned, and the detailed description thereof will not be repeated. As shown in FIG. 23, in the scanning optical system 300, the scanning lens 30 is a single lens. Each of the scanning lens 30 and the compensation lenses 51–54 is made of plastic.

TABLE 11 indicates a numerical structure of the scanning optical system 300 from the light incident side of the cylindrical lens 13 to the photoconductive drum. In TABLE 11, surfaces #1 and #2 represent surfaces of the cylindrical lens 13, and surface #3 is the reflection surface of the polygonal mirror 20, surfaces #4 and #5 represent the scanning lens 30. Surfaces #6 and #7 represent the compensation lens 51(54) for the outer beam. Surface #8 represents the photoconductive drum 61(64) for the outer beam. Surfaces #9 and #10 represent the compensation lens 52(53) for the inner beam. Surface #11 represents the photoconductive drum 62(63) for the inner beam. Each symbol in TABLE 11 has the same meaning as that in TABLE 1.

TABLE 11 focal length = 220 mm
scanning width = 216 mm
design wavelength = 780 nm
incident angle with respect to polygonal mirror
−74.0° (main scanning direction)
2.76° (auxiliary scanning direction; outer beam)
0.92° (auxiliary scanning direction; inner beam)

| Surface | Ry | Rz | d | n | DECZ |
|---|---|---|---|---|---|
| #1 | ∞ | −51.08 | 4.00 | 1.51072 | 0.00 |
| #2 | ∞ | — | 97.00 | — | — |

TABLE 11-continued

| #3 | ∞ | — | 47.50 | — | 0.00 |
| #4 | −175.00 | — | 9.00 | 1.48617 | 0.00 |
| #5 | −65.00 | −100.00 | 132.50 | — | — |
| #6 | −427.90 | — | 5.00 | 1.48617 | 8.00 |
| #7 | −1200.00 | — | 79.73 | — | — |
| #8 | ∞ | — | 0.00 | — | 9.93 |
| #9 | −427.70 | — | 5.00 | 1.48617 | 2.50 |
| #10 | −1200.00 | — | 79.73 | — | — |
| #11 | ∞ | — | 0.00 | — | 3.50 |

In TABLE 11, surface #1 is a cylindrical surface, surfaces #2 and #3 are planar surfaces, surface #4 is a spherical surface, and surface #5 is an anamorphic aspherical surface. Surfaces #6 and #9 are aspherical surfaces defined by two-dimensional polynomial expressions, surfaces #7 and #10 are spherical surfaces.

Values of the coefficients for the surface #5 are indicated in TABLE 12.

TABLE 12 surface #5 (anamorphic aspherical surface)
$\kappa = 0.000$

| $AM_1 = 0.00$ | $AS_1 = 8.62 \times 10^{-6}$ |
| $AM_2 = -8.21 \times 10^{-6}$ | $AS_2 = 3.49 \times 10^{-6}$ |
| $AM_3 = 0.00$ | $AS_3 = 2.21 \times 10^{-8}$ |
| $AM_4 = 1.56 \times 10^{-7}$ | $AS_4 = -2.90 \times 10^{-9}$ |
| $AM_5 = 0.00$ | $AS_5 = -1.82 \times 10^{-11}$ |
| $AM_6 = 1.05 \times 10^{-11}$ | $AS_6 = 5.76 \times 10^{-13}$ |

Values of the coefficients for the surface #6 of the compensation lens 51 and the surface #9 of the compensation lens 52 are indicated in TABLE 13 and TABLE 14, respectively.

TABLE 13 surface #6 for the outer beams

| $B_{mn}$ | n = 0 | n = 1 | n = 2 | n = 3 | n = 4 |
|---|---|---|---|---|---|
| m = 0 | — | $3.645 \times 10^{-2}$ | $1.832 \times 10^{-2}$ | $6.407 \times 10^{-5}$ | $-2.644 \times 10^{-6}$ |
| m = 2 | $4.298 \times 10^{-8}$ | $1.174 \times 10^{-6}$ | $-3.640 \times 10^{-7}$ | $-2.420 \times 10^{-8}$ | $-6.244 \times 10^{-10}$ |
| m = 4 | $8.925 \times 10^{-8}$ | $-2.401 \times 10^{-10}$ | $1.943 \times 10^{-11}$ | $3.490 \times 10^{-13}$ | $-3.477 \times 10^{-14}$ |
| m = 6 | $-2.041 \times 10^{-12}$ | $9.635 \times 10^{-15}$ | $-1.395 \times 10^{-15}$ | $2.677 \times 10^{-16}$ | $-1.385 \times 10^{-18}$ |
| m = 8 | $1.502 \times 10^{-18}$ | 0.000 | 0.000 | 0.000 | 0.000 |

TABLE 14 surface #9 for the inner beams

| $B_{mn}$ | N = 0 | N = 1 | n = 2 | n = 3 | n = 4 |
|---|---|---|---|---|---|
| m = 0 | — | $1.619 \times 10^{-3}$ | $1.846 \times 10^{-2}$ | $-1.607 \times 10^{-5}$ | $-1.622 \times 10^{-6}$ |
| m = 2 | $-1.279 \times 10^{-5}$ | $6.042 \times 10^{-7}$ | $-3.260 \times 10^{-7}$ | $-1.056 \times 10^{-10}$ | $-6.600 \times 10^{-10}$ |
| m = 4 | $9.463 \times 10^{-8}$ | $-7.814 \times 10^{-11}$ | $8.576 \times 10^{-13}$ | $1.797 \times 10^{-12}$ | $-2.971 \times 10^{-14}$ |
| m = 6 | $-2.912 \times 10^{-12}$ | $2.457 \times 10^{-15}$ | $7.123 \times 10^{-16}$ | $-3.658 \times 10^{-16}$ | $-1.239 \times 10^{-18}$ |
| m = 8 | $5.821 \times 10^{-17}$ | 0.000 | 0.000 | 0.000 | 0.000 |

Figure 26:
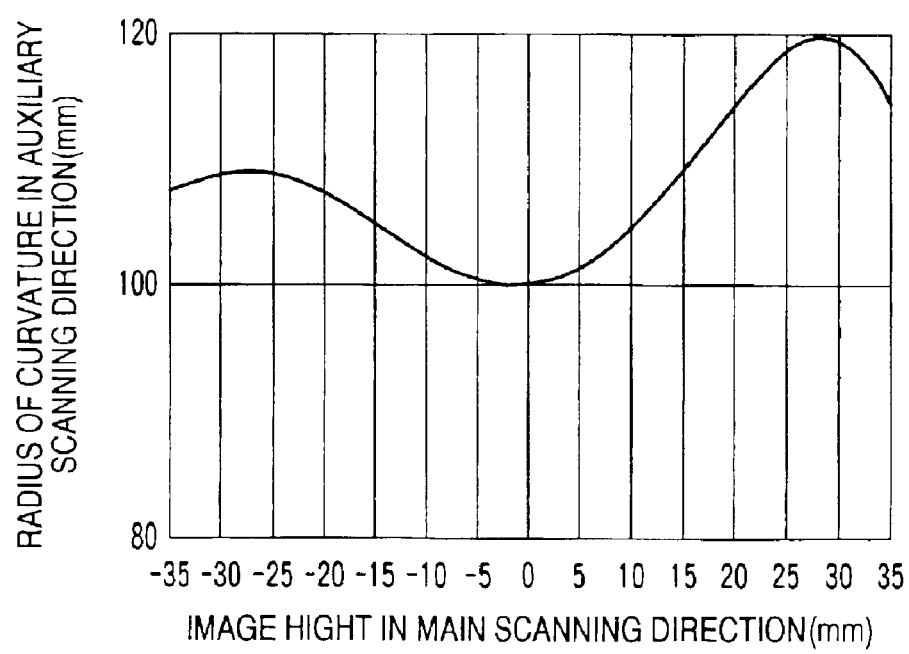
FIG. 26 is a graph showing distribution in the main scanning direction of a radius of curvature in the auxiliary scanning direction of the photoconductive drum side surface of a scanning lens in the third example.
Figure 27A:
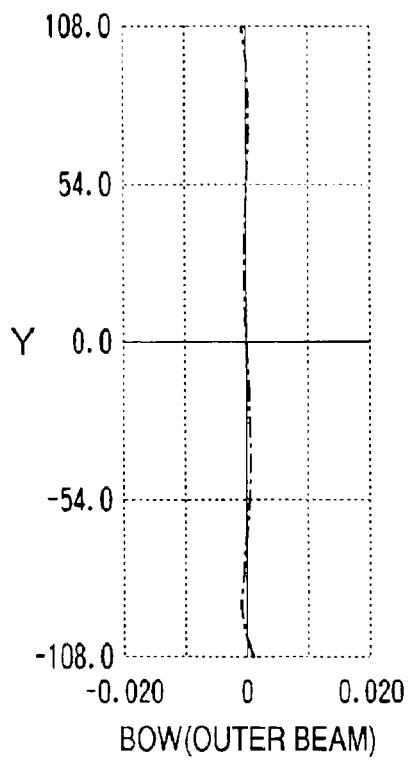
FIG. 27A is a graph showing a bow as to the outer beam in the third example.
Figure 27B:
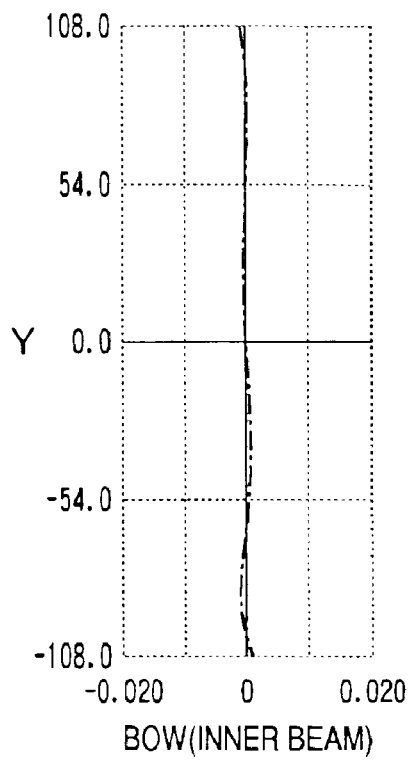
FIG. 27B is a graph showing a bow as to the inner beam in the third example.

In this third example, distribution in the main scanning direction of power in the auxiliary scanning direction of the photoconductive drum side surface (i.e., surface #5) of the scanning lens 30 has asymmetry with respect to the optical axis as shown in FIG. 26. FIG. 26 is a graph showing distribution in the main scanning direction of a radius of curvature of the photoconductive drum side surface of the scanning lens 30 in the auxiliary scanning direction. Therefore, asymmetry in a curve of the scanning line is corrected. As a result, a curve of the scanning line (i.e., a bow) is sufficiently suppressed as shown in FIGS. 27A and 27B. FIG. 27A is a graph showing a bow with regard to an optical system through which the outer beam passes. FIG. 27B is a graph showing a bow with regard to an optical system through which the inner beam passes.

Figure 28A:
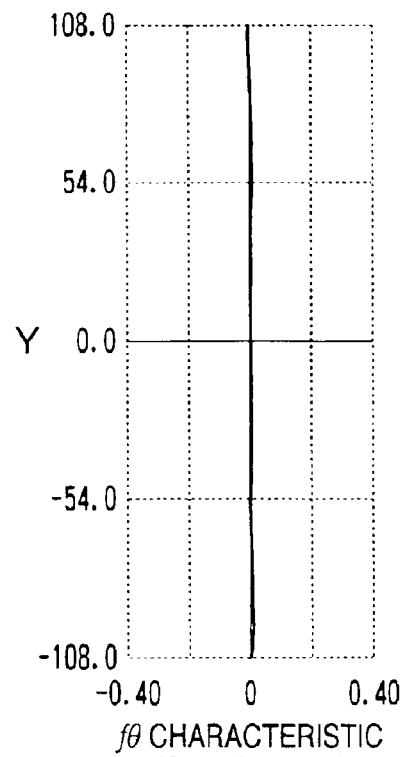
FIG. 28A is a graph showing a fθ characteristic with regard to the outer beam in the third example.
Figure 28B:
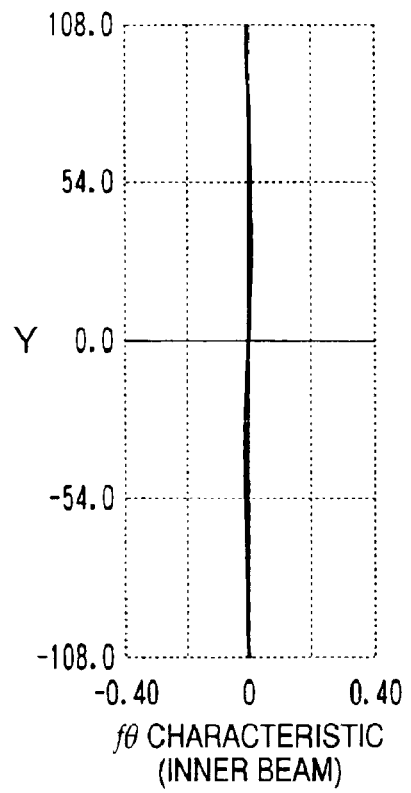
FIG. 28B is a graph showing a fθ characteristic with regard to the inner beam in the third example.
Figure 29A:
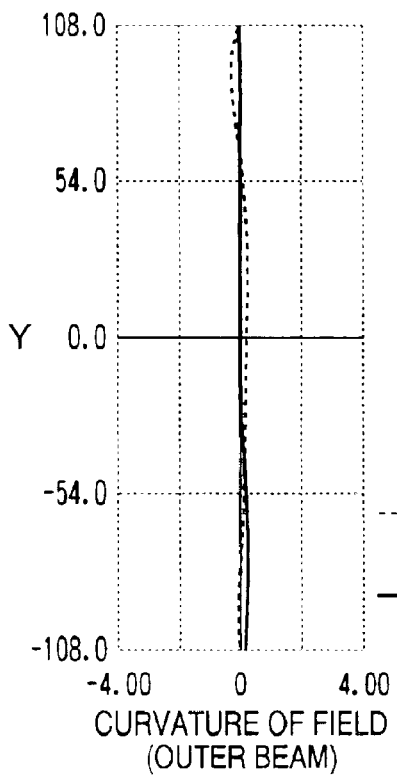
FIG. 29A is a graph showing curvature of field as to the outer beam in the third example.
Figure 29B:
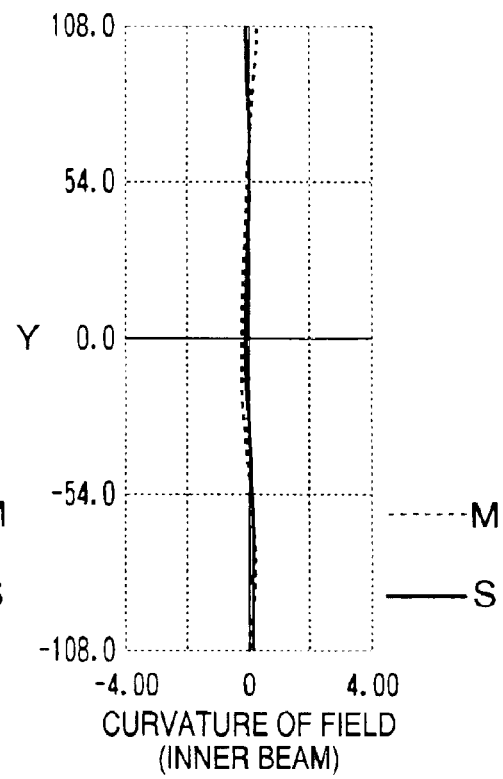
FIG. 29B is a graph showing curvature of field as to the inner beam in the third example.

FIGS. 28A–31B show the other aberrations in the scanning optical system 300 according to the third example. FIGS. 28A and 28B are graphs showing fθ characteristics with regard to the outer beam and the inner beam, respectively. FIG. 29A is a graph showing curvature of field with regard to the outer beam. FIG. 29B is a graph showing curvature of field with regard to the inner beam. FIG. 30A is a graph showing a change of F number with regard to the outer beam. FIG. 30B is a graph showing a change of F number with regard to the inner beam. In each of the FIGS. 29A–30B, a broken line M and a solid line S show characteristics as to the main scanning direction and the auxiliary scanning direction, respectively.

Figure 31A:
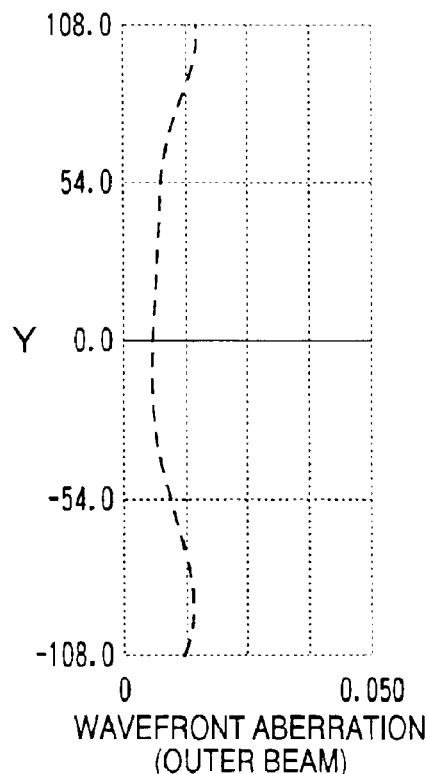
FIG. 31A is a graph showing a wavefront aberration with regard to an optical system through which the outer beam passes in the third example.
Figure 31B:
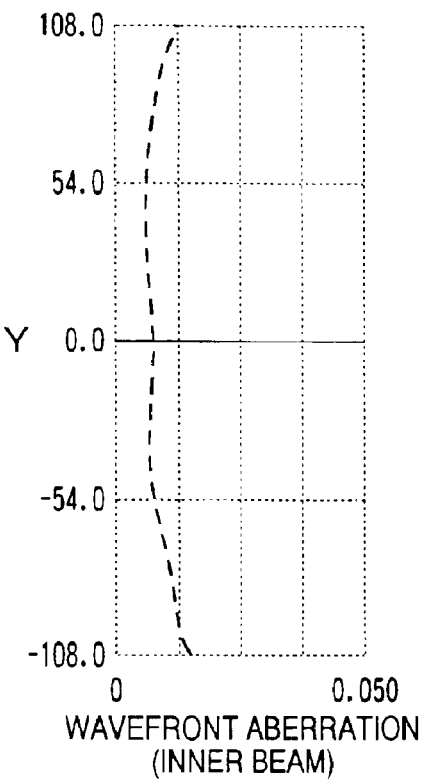
FIG. 31B is a graph showing a wavefront aberration with regard to an optical system through which the inner beam passes in the third example.

FIG. 31A is a graph showing a wavefront aberration with regard to an optical system through which the outer beam passes. FIG. 31B is a graph showing a wavefront aberration with regard to an optical system through which the inner beam passes.

Figure 30A:
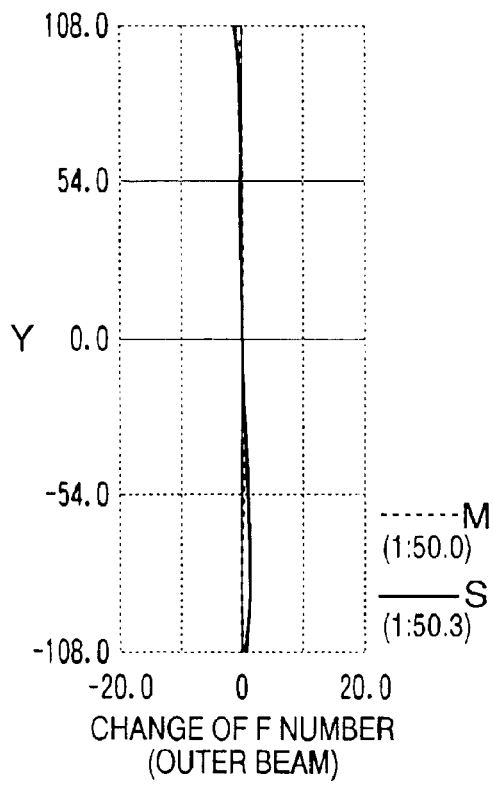
FIG. 30A is a graph showing a change of F number with regard to the outer beam in the third example.
Figure 30B:
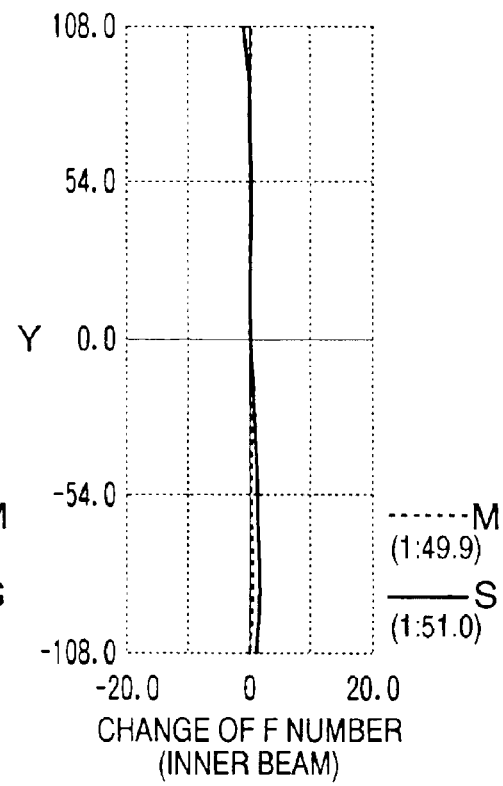
FIG. 30B is a graph showing a change of F number with regard to the inner beam in the third example.

In each graph, the longitudinal axis represents an image height (unit: mm), and the horizontal axis represents an amount of aberration. The unit of the amount of aberration in each of FIGS. 27A–29B is a millimeter. The unit of the amount of aberration in each of FIGS. 30A and 30B is a percent. The unit of the amount of aberration in each of FIGS. 31A and 31B is a wavelength.

As shown in FIGS. 27A–31B, the scanning optical system 300 according to the third example can compensate for a bow and an inclination of a bow while satisfying essential characteristics for a scanning optical system such as a fθ characteristic, correction of a curvature of field.

FOURTH EXAMPLE

Figure 32:
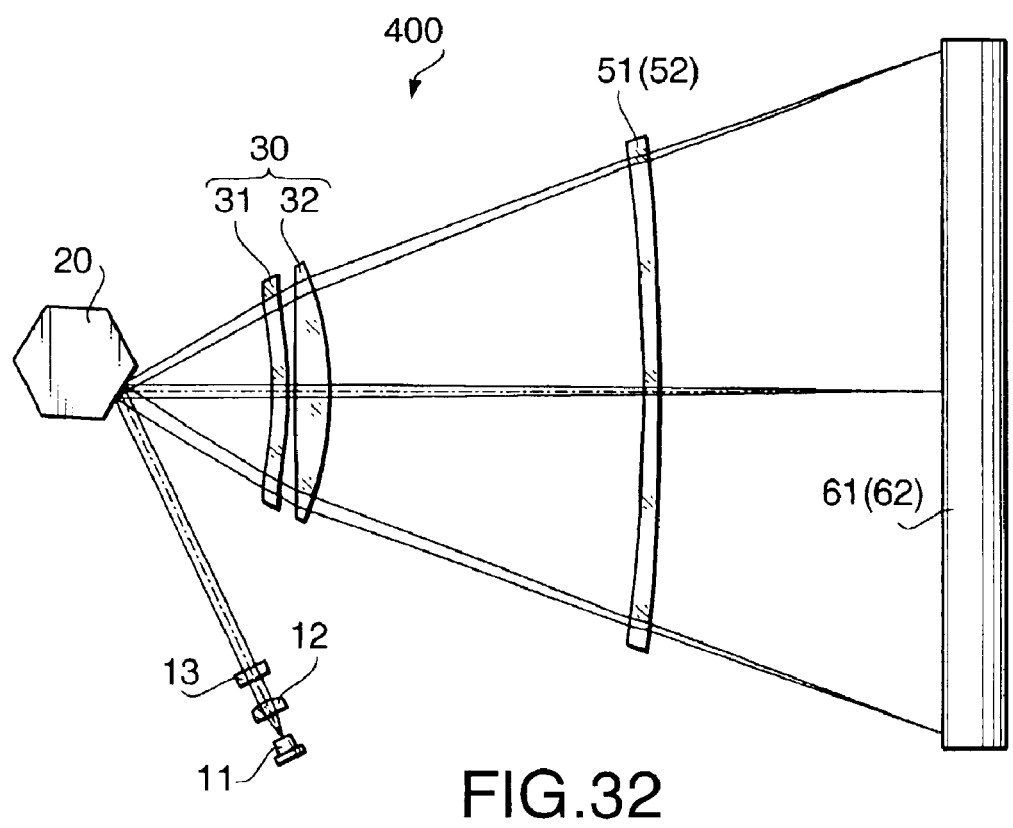
FIG. 32 is a developed view of a scanning optical system according to a fourth example viewed from a line parallel with a rotational axis of a polygonal mirror.
Figure 33:
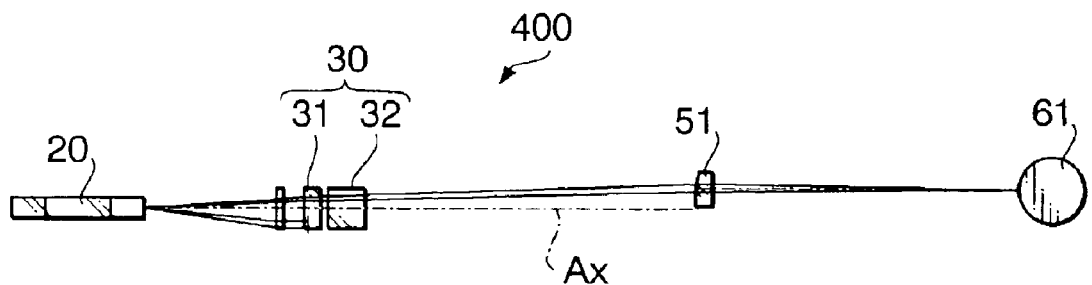
FIG. 33 is a developed view of the scanning optical system of the fourth example with regard to an outer beam viewed from a line parallel with a main scanning direction.
Figure 34:
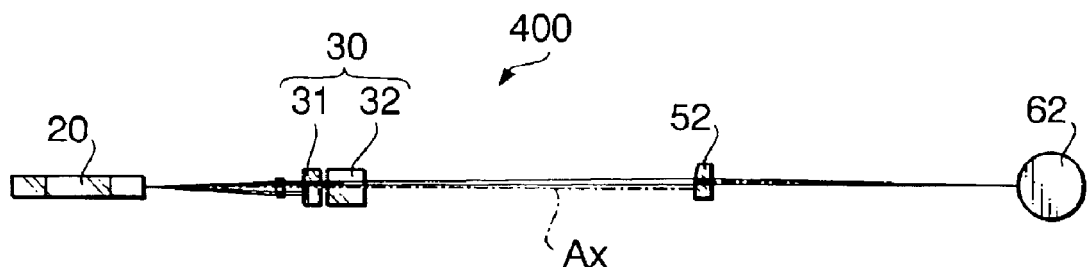
FIG. 34 is a developed view of the scanning optical system of the fourth example with regard to an inner beam viewed from a line parallel with the main scanning direction.

FIGS. 32–34 show a scanning optical system 400 according to a fourth example. FIG. 32 is a developed view of the scanning optical system 400 viewed along a line parallel with the rotational axis of the polygonal mirror 20. FIG. 33 is a developed view of the scanning optical system 400 with regard to the outer beam L1 viewed along a line parallel with the main scanning direction. FIG. 34 is a developed view of the scanning optical system 400 with regard to the inner beam L2 viewed along a line parallel with the main scanning direction.

In FIGS. 32–34, to elements which are similar to those in FIG. 1, the same reference numbers are assigned, and the detailed description thereof will not be repeated. As shown in FIG. 32, in the scanning optical system 400, the scanning lens 30 includes the first lens 31 and the second lens 32. Each of the first lens 31 and the compensation lenses 51–54 is made of plastic. The second lens 32 is made of glass.

TABLE 15 indicates a numerical structure of the scanning optical system 400 from the light incident side of the cylindrical lens 13 to the photoconductive drum. In TABLE 15, surfaces #1 and #2 represents surfaces of the cylindrical lens 13, surface #3 is the reflection surface of the polygonal mirror 20, surfaces #4 and #5 represent the first lens 31 of the scanning lens 30, surfaces #6 and #7 represent the second lens 32. Surfaces #8 and #9 represent the compensation lens 51(54) for the outer beam. Surface #10 represents the photoconductive drum 61(64) for the outer beam. Surfaces #11 and #12 represent the compensation lens 52(53) for the inner beam. Surface #13 represents the photoconductive drum 62(63) for the inner beam. Each symbol in TABLE 15 has the same meaning as that in TABLE 1.

TABLE 15 focal length = 200 mm
scanning width = 216 mm
design wavelength = 780 nm
incident angle with respect to polygonal mirror
 −65° (main scanning direction)
 2.76° (auxiliary scanning direction; outer beam)
 0.92° (auxiliary scanning direction; inner beam)

| Surface | Ry | Rz | d | n | DECZ |
|---|---|---|---|---|---|
| #1 | ∞ | −51.08 | 4.00 | 1.51072 | 0.00 |
| #2 | ∞ | — | 97.00 | — | — |
| #3 | ∞ | — | 48.50 | — | 0.00 |
| #4 | −100.00 | — | 5.00 | 1.48617 | 0.00 |
| #5 | −100.00 | −100.00 | 2.50 | — | — |
| #6 | ∞ | — | 11.50 | 1.51072 | 0.00 |
| #7 | −100.00 | — | 102.50 | — | — |
| #8 | −612.20 | — | 5.00 | 1.48617 | 6.00 |
| #9 | −2000.00 | — | 91.87 | — | — |
| #10 | ∞ | — | 0.00 | — | 5.32 |
| #11 | −619.40 | — | 5.00 | 1.48617 | 2.50 |
| #12 | −2000.00 | — | 91.78 | — | — |
| #13 | ∞ | — | 0.00 | — | 2.32 |

In TABLE 15, surface #1 is a cylindrical surface, surfaces #2 and #3 are planar surfaces, surface #4 is a rotationally symmetrical aspherical surface, and surface #5 is an anamorphic aspherical surface. Surface #6 is a planar surface, surfaces #7, #8 and #11 are spherical surfaces, and surface #9 and #12 are aspherical surfaces defined by two-dimensional polynomial expressions.

Conical coefficients and aspherical coefficients for the surface #4 are indicated in TABLE 16.

TABLE 16

| surface #4 (rotationally symmetrical aspherical surface) | |
|---|---|
| κ | 0.00 |
| $A_4$ | $2.00 \times 10^{-6}$ |
| $A_6$ | $1.18 \times 10^{-10}$ |

Values of the coefficients for the surface #5 are indicated in TABLE 17.

TABLE 17 surface #5 (anamorphic aspherical surface)
κ = 0.000

| $AM_1 = 0.00$ | $AS_1 = 5.96 \times 10^{-6}$ |
|---|---|
| $AM_2 = -1.09 \times 10^{-5}$ | $AS_2 = 7.34 \times 10^{-6}$ |
| $AM_3 = 0.00$ | $AS_3 = 1.95 \times 10^{-8}$ |
| $AM_4 = 1.87 \times 10^{-6}$ | $AS_4 = 1.73 \times 10^{-9}$ |
| $AM_5 = 0.00$ | $AS_5 = -1.45 \times 10^{-11}$ |
| $AM_6 = 1.07 \times 10^{-10}$ | $AS_6 = -7.02 \times 10^{-13}$ |

Values of the coefficients for the surface #9 of the compensation lens 51 and the surface #12 of the compensation lens 52 are indicated in TABLE 18 and TABLE 19, respectively.

TABLE 18

| $B_{mn}$ | surface #9 for the outer beams | | | | |
|---|---|---|---|---|---|
| | n = 0 | n = 1 | n = 2 | n = 3 | n = 4 |
| m = 0 | — | $-4.618 \times 10^{-2}$ | $-1.683 \times 10^{-2}$ | $-8.682 \times 10^{-6}$ | $2.190 \times 10^{-7}$ |
| m = 2 | $3.008 \times 10^{-5}$ | $8.414 \times 10^{-7}$ | $3.774 \times 10^{-7}$ | $5.453 \times 10^{-9}$ | $-1.141 \times 10^{-11}$ |
| m = 4 | $-8.511 \times 10^{-8}$ | $-1.012 \times 10^{-10}$ | $-2.645 \times 10^{-11}$ | $6.649 \times 10^{-13}$ | $2.035 \times 10^{-15}$ |
| m = 6 | $5.845 \times 10^{-12}$ | $4.956 \times 10^{-15}$ | $-1.620 \times 10^{-15}$ | $6.486 \times 10^{-17}$ | 0.000 |
| m = 8 | $-3.288 \times 10^{-16}$ | 0.000 | 0.000 | 0.000 | 0.000 |

TABLE 19 surface #12 for the inner beams

| $B_{mn}$ | n = 0 | n = 1 | n = 2 | n = 3 | n = 4 |
|---|---|---|---|---|---|
| m = 0 | — | $-2.969 \times 10^{-2}$ | $-1.688 \times 10^{-2}$ | $-2.601 \times 10^{-6}$ | $2.039 \times 10^{-7}$ |
| m = 2 | $3.469 \times 10^{-5}$ | $6.150 \times 10^{-7}$ | $3.960 \times 10^{-7}$ | $5.960 \times 10^{-9}$ | $-1.110 \times 10^{-11}$ |
| m = 4 | $-8.347 \times 10^{-8}$ | $-5.460 \times 10^{-11}$ | $-2.541 \times 10^{-11}$ | $4.052 \times 10^{-14}$ | $2.253 \times 10^{-15}$ |
| m = 6 | $5.625 \times 10^{-12}$ | $1.600 \times 10^{-15}$ | $3.308 \times 10^{-16}$ | $-5.140 \times 10^{-17}$ | 0.000 |
| m = 8 | $-3.181 \times 10^{-16}$ | 0.000 | 0.000 | 0.000 | 0.000 |

Figure 35:
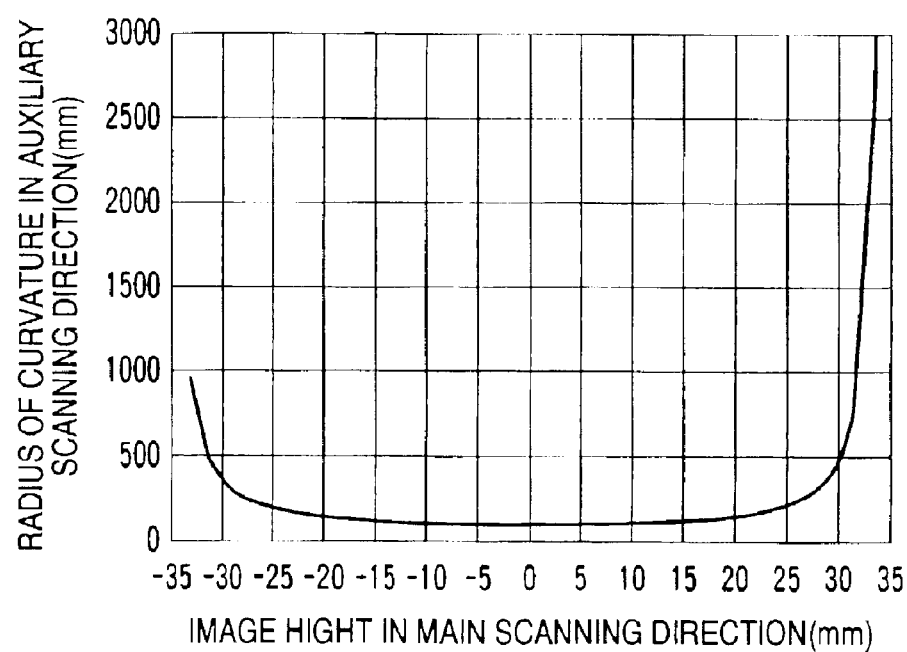
FIG. 35 is a graph showing distribution in the main scanning direction of radius of curvature in the auxiliary scanning direction of the photoconductive drum side surface of a first lens of a scanning lens in the fourth example.

In this fourth example, distribution in the main scanning direction of power in the auxiliary scanning direction of the photoconductive drum side surface (i.e., surface #5) of the first lens 31 has asymmetry with respect to the optical axis as shown in FIG. 35. FIG. 35 is a graph showing distribution in the main scanning direction of a radius of curvature of the photoconductive drum side surface of the first lens 31 in the auxiliary scanning direction. Therefore, asymmetry in a curve of the scanning line is corrected. As a result, a curve of the scanning line (i.e., a bow) is sufficiently suppressed as shown in FIGS. 36A and 36B. FIG. 36A is a graph showing a bow with regard to an optical system through which the outer beam passes. FIG. 36B is a graph showing a bow with regard to an optical system through which the inner beam passes.

FIGS. 37A–40B show the other aberrations in the scanning optical system 400 according to the fourth example. FIGS. 37A and 37B are graphs showing fθ characteristics with regard to the outer beam and the inner beam, respectively. FIG. 38A is a graph showing curvature of field with regard to the outer beam. FIG. 38B is a graph showing curvature of field with regard to the inner beam. FIG. 39A is a graph showing a change of F number with regard to the outer beam. FIG. 39B is a graph showing a change of F number with regard to the inner beam. In each of the FIGS. 38A–39B, a broken line M and a solid line S show characteristics as to the main scanning direction and the auxiliary scanning direction, respectively.

Figure 40A:
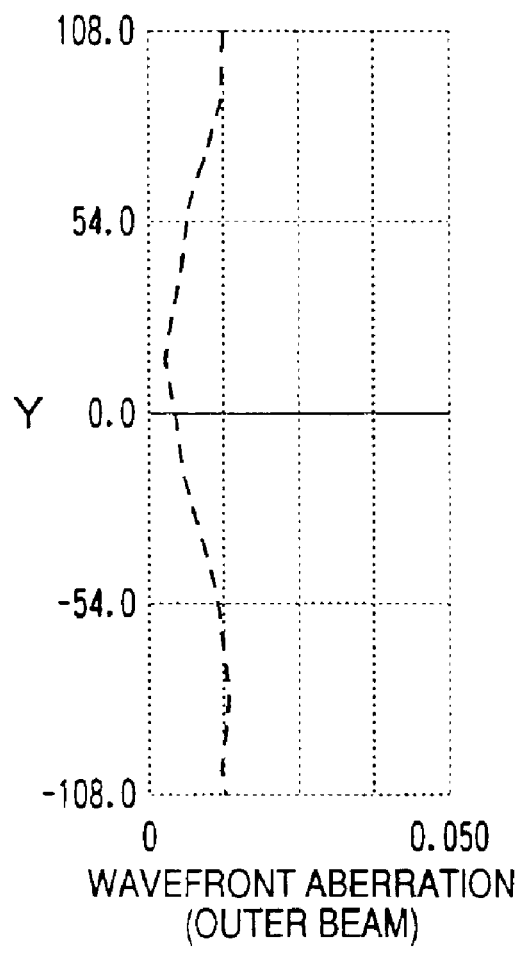
FIG. 40A is a graph showing a wavefront aberration with regard to an optical system through which the outer beam passes in the fourth example.
Figure 40B:
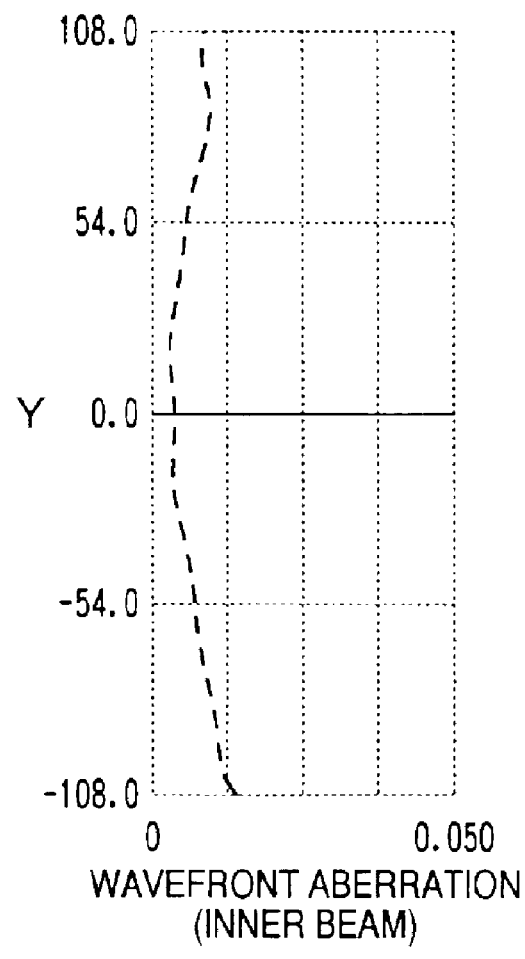
FIG. 40B is a graph showing a wavefront aberration with regard to an optical system through which the inner beam passes in the fourth example.

FIG. 40A is a graph showing a wavefront aberration with regard to an optical system through which the outer beam passes. FIG. 40B is a graph showing a wavefront aberration with regard to an optical system through which the inner beam passes.

In each graph, the longitudinal axis represents an image height (unit: mm), and the horizontal axis represents an amount of an aberration. The unit of the amount of an aberration in each of FIGS. 36A–38B is a millimeter. The unit of the amount of an aberration in each of FIGS. 39A and 39B is a percent. The unit of the amount of an aberration in each of FIGS. 40A and 40B is a wavelength.

As shown in FIGS. 36A–40B, the scanning optical system 400 according to the fourth example can compensate for a bow and an inclination of a bow while satisfying essential characteristics for a scanning optical system such as a fθ characteristic, correction of a curvature of field.

As shown below, each of the above-described examples satisfies the above consition (1):

$$|Rz(0)| < |Rz(-Y)| < |Rz(Y)|$$

As described above, condition (1) defines distribution in the main scanning direction of radii of curvature in the auxiliary scanning direction of the anamorphic aspherical surface of the scanning lens 30.

In TABLE 20, absolute values of Rz(−35) and Rz(35) which represent radii of curvature in the auxiliary scanning direction of the anamorphic aspherical surface of the scanning lens 30 at image heights of −35 mm and 35 mm, respectively, are indicated for each of the examples. In addition, an absolute value of Rz(0) which represents a radius of curvature at image height zero is indicated for each of the examples.

TABLE 20

| Examples | \|Rz(0)\| | \|Rz(−35)\| | \|Rz(35)\| |
|---|---|---|---|
| First | 100.000 | 578.193 | 875.033 |
| Second | 100.000 | 124.193 | 133.400 |
| Third | 100.000 | 107.339 | 114.621 |
| Fourth | 100.000 | 956.976 | 2540.960 |

As can be seen from TABLE 20, each of the above examples satisfies condition (1).

As described above, according to the embodiment of the invention, an inclination of the scanning line caused by asymmetry of a change of the deflection position can be corrected because the anamorphic aspherical surface of the scanning lens has asymmetry of distribution in the main scanning direction of power in the auxiliary scanning direction.

According to the embodiment of the invention, the plurality of scanning lines corresponding to the plurality of beams whose incident angles in the auxiliary scanning direction with respect to the polygonal mirror are different coincide with each other. Accordingly, occurrence of the color drift in the color laser printer can be prevented.

According to the embodiment, since the scanning lens 30 is configured to have asymmetry in the main scanning direction, the compensation lens is not required to have asymmetry in the main scanning direction. Therefore, as described above, the same compensation lens can be used for beams whose incident angles in the auxiliary scanning direction with respect to the polygonal mirror have the same absolute values and different signs.

The present disclosure relates to the subject matter contained in Japanese Patent Application No. 2002-010763, filed on Jan. 18, 2002, which is expressly incorporated herein by reference in its entirety.

What is claimed is:

1. A scanning optical system for emitting at least one beam scanning in a main scanning direction, comprising:

a light source that emits at least one beam;

a polygonal mirror that rotates and deflects the at least one beam to scan in the main scanning direction within a predetermined scanning range; and an imaging optical system that converges the at least one beam deflected by said polygonal mirror to form at least one beam spot on a surface to be scanned, the at least one beam spot scanning in the main scanning direction on the surface to be scanned, wherein said imaging optical system has:

a scanning lens; and a compensation lens provided on the surface side with respect to said scanning lens, said compensation lens compensating for curvature of field, wherein said light source is arranged such that the at least one beam emitted by said light source is incident on the polygonal mirror from outside of the predetermined scanning range in the main scanning direction and is incident on the polygonal mirror with the at least one beam being inclined in an auxiliary scanning direction with respect to a plane perpendicular to a rotational axis of said polygonal mirror, wherein at least one surface of said scanning lens has a first anamorphic surface, power of said first anamorphic surface in the auxiliary scanning direction is distributed asymmetrically in the main scanning direction with respect to an optical axis of said scanning lens, wherein power of each surface of said compensation lens in the auxiliary scanning direction is distributed symmetrically with respect to a center position of said each surface.

2. The scanning optical system according to claim 1, wherein said first anamorphic surface of said scanning lens is symmetrical with respect to a plane perpendicular to the auxiliary scanning direction and including the optical axis, and wherein said compensation lens includes a second anamorphic surface which is asymmetrical with respect to a plane perpendicular to the auxiliary scanning direction and including a center position of said second anamorphic surface.

3. The scanning optical system according to claim 1, wherein said first anamorphic surface of said scanning lens is configured such that a cross-sectional shape thereof in the main scanning direction is defined as a function of a distance, in the main scanning direction, from the optical axis of said scanning lens, a cross-sectional shape thereof in the auxiliary scanning direction is formed as an arc, and a curvature in the auxiliary scanning direction is defined as a function of a distance, in the main scanning direction, from the optical axis, the cross-sectional shape in the main scanning direction and the curvature in the auxiliary scanning direction being defined independently from each other.

4. The scanning optical system according to claim 3, wherein said first anamorphic surface of said scanning lens satisfies a condition:

$$|Rz(0)| < |Rz(-Y)| < |Rz(Y)|,$$

where $Rz(Y)$ represents a radius of curvature thereof in the auxiliary scanning direction at a distance Y, the distance Y represents a distance in the main scanning direction with respect to the optical axis, a minus sign of the distance Y corresponds to a side on which the at least one beam is incident on said polygonal mirror, and a plus sign of the distance Y corresponds to the other side.

5. The scanning optical system according to claim 1, wherein one surface of said compensation lens has an aspherical surface, said aspherical surface being defined as a surface in which a tilt angle of a cross-sectional shape in the auxiliary scanning direction changes with a position in the main scanning direction, said aspherical surface being asymmetrical with respect to a plane perpendicular to the auxiliary scanning direction and including a center position of the aspherical surface.

6. The scanning optical system according to claim 5, wherein said aspherical surface of said compensation lens is defined by a two-dimensional polynomial expression in which a SAG amount between a point on said aspherical surface and a plane tangential to said aspherical surface at the center position is defined by coordinates along the main scanning direction and the auxiliary scanning direction.

7. The scanning optical system according to claim 1, wherein said scanning lens is made of plastic.

8. The scanning optical system according to claim 1, wherein said light source emits a plurality of beams, incident angles of the plurality of beams with respect to said polygonal mirror in the auxiliary scanning direction being different from each other, all of the plurality of beams passing though said scanning lens, and wherein said compensation lens is provided for each of the plurality of beams.

9. A scanning optical system for emitting a plurality of beams scanning in a main scanning direction, comprising:

a light source that emits the plurality of beams;

a polygonal mirror that rotates and deflects the plurality of beams to scan in the main scanning direction within a predetermined scanning range; and an imaging optical system that converges the plurality of beams deflected by said polygonal mirror to form a plurality of beam spots on surfaces to be scanned, said plurality of beam spots scanning in the main scanning direction on the surfaces to be scanned, wherein said imaging optical system has:

a scanning lens group; and a plurality of compensation lenses which are provided for the plurality of beams, respectively, and are provided on the surfaces side with respect to said scanning lens group, said compensation lenses compensating for curvature of field, wherein said light source is arranged such that the plurality of beams emitted by said light source are incident on the polygonal mirror from outside of the predetermined scanning range in the main scanning direction and are incident on said polygonal mirror with the plurality of beams being inclined in an auxiliary scanning direction with respect to a plane perpendicular to a rotational axis of said polygonal mirror, the auxiliary scanning direction being perpendicular to the main scanning direction, wherein at least one surface of said scanning lens group has a first anamorphic surface, power of said first anamorphic surface in the auxiliary scanning direction is distributed asymmetrically in the main scanning direction with respect to an optical axis of said scanning lens group, wherein power of each surface of said compensation lenses in the auxiliary scanning direction is distributed symmetrically with respect to a center position of said each surface.

10. The scanning optical system according to claim 9, wherein said first anamorphic surface of said scanning lens group is symmetrical with respect to a plane perpendicular to the auxiliary scanning direction and including the optical axis, and wherein said compensation lenses include a second anamorphic surface which is asymmetrical with respect to a plane perpendicular to the auxiliary scanning direction and including a center position of said second anamorphic surface.

11. The scanning optical system according to claim 9, wherein said first anamorphic surface of said scanning lens group is configured such that a cross-sectional shape thereof in the main scanning direction is defined as a function of a distance, in the main scanning direction, from the optical axis of said scanning lens group, a cross-sectional shape thereof in the auxiliary scanning direction is formed as an arc, and a curvature in the auxiliary scanning direction is defined as a function of a distance, in the main scanning direction, from the optical axis, the cross-sectional shape in the main scanning direction and the curvature in the auxiliary scanning direction being defined independently from each other.

12. The scanning optical system according to claim 11, wherein said first anamorphic surface of said scanning lens group satisfies a condition:

$$|Rz(0)|<|Rz(-Y)|<|Rz(Y)|,$$

where $Rz(Y)$ represents a radius of curvature thereof in the auxiliary scanning direction at a distance Y, the distance Y represents a distance in the main scanning direction with respect to the optical axis, a minus sign of the distance Y corresponds to a side on which the plurality of beam are incident on said polygonal mirror, and a plus sign of the distance Y corresponds to the other side.

13. The scanning optical system according to claim 9, wherein one surface of each of said compensation lenses has an aspherical surface, said aspherical surface being defined as a surface in which a tilt angle of a cross-sectional shape in the auxiliary scanning direction changes with a position in the main scanning direction, said aspherical surface being asymmetrical with respect to a plane perpendicular to the auxiliary scanning direction and including a center position thereof.

14. The scanning optical system according to claim 13, wherein said aspherical surface of each of said compensation lens is defined by a two-dimensional polynomial expression in which a SAG amount between a point on said aspherical surface and a plane tangential to said aspherical surface at the center position is defined by coordinates along the main scanning direction and the auxiliary scanning direction.

15. The scanning optical system according to claim 9, wherein said scanning lens group includes a single lens having said first anamorphic surface, said single lens being made of plastic.

16. The scanning optical system according to claim 9, wherein incident angles of the plurality of beams with respect to said polygonal mirror in the auxiliary scanning direction are different from each other, all of the plurality of beams passing though said scanning lens group, and wherein each of said compensation lenses is provided for beams of the plurality of beams having substantially the same incident angles with respect to said polygonal mirror.

17. The scanning optical system according to claim 16, wherein the plurality of beams include a pair of beams whose incident angles in the auxiliary scanning direction with respect to said polygonal mirror have the same absolute values and have different signs, and wherein configuration of said compensation lenses provided for the pair of beams are equal to each other and are placed so as to be symmetrical with respect to a line extending along the optical axis of said scanning lens group.

18. The scanning optical system according to claim 9, wherein said scanning lens group consists of a single scanning lens.

* * * * *